US012675502B2

(12) United States Patent
Tholar et al.

(10) Patent No.: US 12,675,502 B2
(45) Date of Patent: Jul. 7, 2026

(54) SYSTEM AND METHOD FOR CLASSIFYING DATASETS TO GUIDE ACTION

(71) Applicant: Actimize Ltd., Ra'anana (IL)

(72) Inventors: Sunny Tholar, Pune (IN); Sumit Kumar, Pune (IN); Miroslav Mocak, Kosice (SK)

(73) Assignee: Actimize Ltd. (IL)

( * ) Notice: Subject to any disclaimer, the term of this patent is extended or adjusted under 35 U.S.C. 154(b) by 0 days.

(21) Appl. No.: 18/770,897

(22) Filed: Jul. 12, 2024

(65) Prior Publication Data
US 2026/0017286 A1    Jan. 15, 2026

(51) Int. Cl.
*G06F 17/00* (2019.01)
*G06F 16/28* (2019.01)

(52) U.S. Cl.
CPC .................................. *G06F 16/285* (2019.01)

(58) Field of Classification Search
CPC .................................................... G06F 16/285
See application file for complete search history.

(56) References Cited

U.S. PATENT DOCUMENTS

| | | | | |
|---|---|---|---|---|
| 9,240,121 | B2 * | 1/2016 | Banerjee | G06F 11/0793 |
| 11,789,982 | B2 * | 10/2023 | Tumpic | G06F 16/2255 |
| | | | | 707/740 |
| 12,164,553 | B1 * | 12/2024 | Martos Triguero ... | G06F 16/353 |
| 2006/0294095 | A1 * | 12/2006 | Berk | G06Q 30/02 |
| 2018/0108235 | A1 * | 4/2018 | Ginocchio | H04W 4/02 |
| 2023/0004835 | A1 * | 1/2023 | Sawhney | G06Q 10/063112 |
| 2023/0418948 | A1 * | 12/2023 | Karpovsky | G06F 21/554 |
| 2024/0160642 | A1 * | 5/2024 | Cakaloglu | G06Q 30/0201 |

* cited by examiner

*Primary Examiner* — Greta L Robinson

(57) ABSTRACT

A system and method for identifying data connections may submit alert data items of one or more datasets to a machine learning model, wherein the alert data items of each dataset include: an alert rule that initiated an alert for the dataset including a first set of thresholds, one or more data values assessed by the first set of thresholds in the generation of the alert, and an alert categorization of the alert selected from a true positive categorization or a false positive categorization; assess, combinations of the alert categorization in relation to the one or more data values and the alert rule; generate a second set of thresholds for the one or more data values, wherein the second set of thresholds has a reduced false positive categorization of the alerts compared to the first set of thresholds; and update the alert rule to comprise the second set of thresholds.

17 Claims, 18 Drawing Sheets

300

SUBMITTING ALERT DATA ITEMS OF ONE OR MORE DATASETS TO A MACHINE LEARNING (ML) MODEL, WHEREIN THE ALERT DATA ITEMS OF EACH DATASET INCLUDE: AN ALERT RULE THAT INITIATED AN ALERT FOR THE DATASET INCLUDING A FIRST SET OF THRESHOLDS, ONE OR MORE DATA VALUES ASSESSED BY THE FIRST SET OF THRESHOLDS IN THE GENERATION OF THE ALERT, AND AN ALERT CATEGORIZATION OF THE ALERT SELECTED FROM A GROUP CONSISTING OF: A TRUE POSITIVE CATEGORIZATION AND A FALSE POSITIVE CATEGORIZATION

302

ASSESSING, BY THE ML MODEL, COMBINATIONS OF THE ALERT CATEGORIZATION IN RELATION TO THE ONE OR MORE DATA VALUES AND THE ALERT RULE

304

Figure 3B:
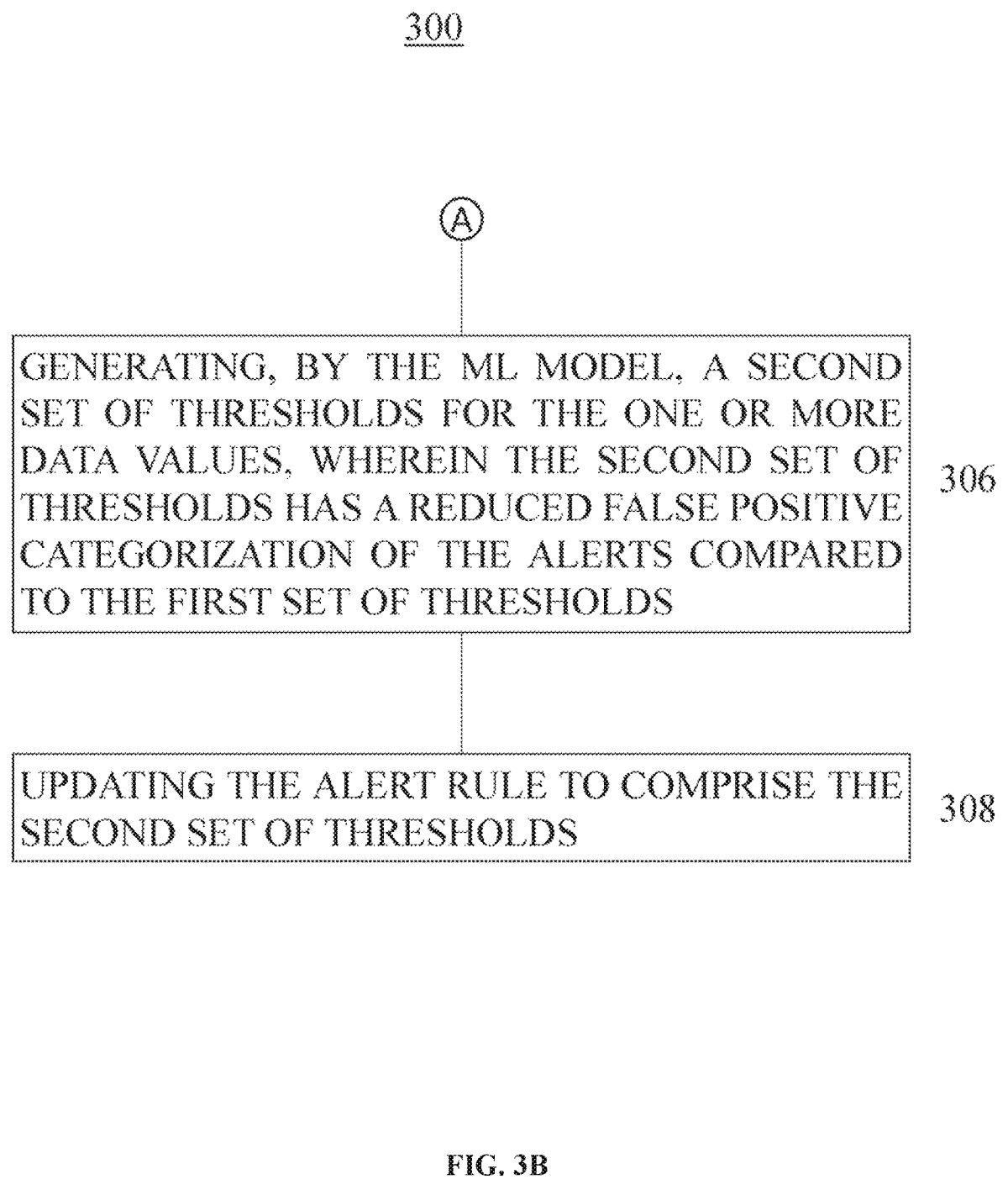

GENERATING, BY THE ML MODEL, A SECOND
SET OF THRESHOLDS FOR THE ONE OR MORE
DATA VALUES, WHEREIN THE SECOND SET OF
THRESHOLDS HAS A REDUCED FALSE POSITIVE
CATEGORIZATION OF THE ALERTS COMPARED
TO THE FIRST SET OF THRESHOLDS            306

UPDATING THE ALERT RULE TO COMPRISE THE
SECOND SET OF THRESHOLDS            308

| Variable (X) | Score |
|---|---|
| 5-20 | 10 |
| 21-40 | 15 |
| >40 | 20 |

_410_

| Variable (X) | Score |
|---|---|
| 5-20 | 8 |
| 21-40 | 5 |
| >40 | 10 |

_415_

| Variable (X) | Score |
|---|---|
| 5-10 | 10 |
| 10-30 | 15 |
| >30 | 20 |

_420_

| Variable (X) | Score |
|---|---|
| 5-10 | 8 |
| 10-30 | 5 |
| >30 | 10 |

Details ⌄

Description ...........................................................................................

Properties ...........................................................................................

| | |
|---|---|
| Item Type | Party Activity Daily |
| Item ID | SAM1-980 |
| Item Date | 12/28/2012 |
| Score | 100 |
| Business Unit | 2000000_TOK |
| Step | Ready |
| Owner | |

Predictive Score ...................................................................................

Predictive Score: 45.0

Supporting Evidence: 55.0

| | |
|---|---|
| The sum of all the transactions in a week is | 35.0 |
| The account stated value in account currency is | 20.0 |

Contradicting Evidence: -10.0

| | |
|---|---|
| The average issue score is | -8.0 |
| The number of accounts in the business unit is | -2.0 |

FIG. 15

Training Data

Example of Alert Routing

| Percentile | Min Score | Max Score | True Positives | False Positives | TP Rate | FP Rate | Cumulated TP Rate | Cumulated FP Rate | KS | Classification | Alert % | Precision |
|---|---|---|---|---|---|---|---|---|---|---|---|---|
| 0 | 0.8138424 | 0.9987888 | 728 | 0 | 27.41% | 0.00% | 27.41% | 0.00% | 27.4 | SAR Preparation | 1.00% | 100.00% |
| 1 | 0.5642257 | 0.8137472 | 644 | 84 | 24.25% | 0.12% | 51.66% | 0.12% | 51.5 | | | |
| 2 | 0.3297857 | 0.5640106 | 441 | 287 | 16.60% | 0.41% | 68.26% | 0.53% | 67.7 | | | |
| 3 | 0.1912434 | 0.3291938 | 273 | 454 | 10.28% | 0.65% | 78.54% | 1.18% | 77.4 | | | |
| 4 | 0.119463 | 0.1904296 | 121 | 607 | 4.56% | 0.87% | 83.09% | 2.04% | 81.1 | | | |
| 5 | 0.0863356 | 0.1194551 | 52 | 676 | 1.96% | 0.96% | 85.05% | 3.01% | 82 | Level 2 Investigation | 8.54% | 26.61% |
| 6 | 0.0687063 | 0.0862821 | 42 | 685 | 1.58% | 0.98% | 86.63% | 3.98% | 82.7 | | | |
| 7 | 0.0574321 | 0.0688605 | 35 | 693 | 1.32% | 0.99% | 87.95% | 4.97% | 83 | | | |
| 8 | 0.0509401 | 0.0574126 | 38 | 690 | 1.43% | 0.98% | 89.38% | 5.96% | 83.4 | | | |
| 9 | 0.0482381 | 0.0509381 | 8 | 386 | 0.30% | 0.55% | 89.68% | 6.51% | 83.2 | | | |
| 10 | 0.023956 | 0.048232 | 186 | 7424 | 7.00% | 10.59% | 96.69% | 17.10% | 79.6 | | | |
| 20 | 0.013745 | 0.023955 | 49 | 7228 | 1.84% | 10.31% | 98.53% | 27.40% | 71.1 | Level 1 Investigation | 60.45% | 0.62% |
| 30 | 0.008802 | 0.013745 | 18 | 7269 | 0.68% | 10.35% | 99.21% | 37.76% | 61.5 | | | |
| 40 | 0.005707 | 0.008802 | 6 | 7271 | 0.23% | 10.37% | 99.44% | 48.13% | 51.3 | | | |
| 50 | 0.003704 | 0.005707 | 8 | 7269 | 0.30% | 10.37% | 99.74% | 58.49% | 41.2 | | | |
| 60 | 0.002503 | 0.003704 | 4 | 7273 | 0.15% | 10.37% | 99.89% | 68.87% | 31 | | | |
| 70 | 0.00179 | 0.002503 | 1 | 7276 | 0.04% | 10.38% | 99.92% | 79.25% | 20.7 | | | |
| 80 | 0.00111 | 0.00179 | 2 | 7275 | 0.08% | 10.38% | 100.00% | 89.62% | 10.4 | Hibernate | 30.00% | 0.01% |
| 90 | 0.000026 | 0.00111 | 0 | 7277 | 0.00% | 10.38% | 100.00% | 100.00% | 0 | | | |
| Totals | | | 2656 | 70114 | | | | | | | | |

FIG. 16

| | SIM_SC_1 | SIM_SC_2 | SIM_SC_3 | SIM_SC_4 | SIM_SC_5 | SIM_SC_6 | SIM_SC_7 | SIM_SC_8 | SIM_SC_9 | SIM_SC_10 |
|---|---|---|---|---|---|---|---|---|---|---|
| prod alerting threshold | 40.0 | 40.0 | 40.0 | 40.0 | 40.0 | 40.0 | 40.0 | 40.0 | 40.0 | 40.0 |
| TP expected threshold | 40.0 | 40.0 | 40.0 | 40.0 | 40.0 | 40.0 | 40.0 | 40.0 | 40.0 | 39.0 |
| FP expected threshold | 39.0 | 39.0 | 39.0 | 39.0 | 39.0 | 39.0 | 39.0 | 39.0 | 39.0 | 38.0 |
| TP_suppressed_penalty | -1000.0 | -500.0 | -50.0 | -1500.0 | -1000.0 | -2000.0 | -1250.0 | -1000.0 | -700.0 | -700.0 |
| FP_suppressed_penalty | 1.0 | 1.0 | 1.0 | 2.0 | 2.0 | 2.0 | 1.0 | 1.0 | 1.0 | 1.0 |
| binning depth | 3.0 | 3.0 | 3.0 | 3.0 | 3.0 | 3.0 | 3.0 | 3.0 | 3.0 | 3.0 |
| score values | 3,100,3 | 5,100,5 | 3,100,3 | 3,100,3 | 3,100,3 | 3,100,3 | 5,100,5 | 10,100,10 | 5,100,5 | 10,100,10 |
| Total Issues | 65 | 65 | 65 | 65 | 65 | 65 | 65 | 65 | 65 | 65 |
| Total Non Issues | 7693 | 7693 | 7693 | 7693 | 7693 | 7693 | 7693 | 7693 | 7693 | 7693 |
| Suppressed FPs % | 21.18 | 35.66 | 94.95 | 35.6 | 21.18 | 21.18 | 21 | 20.72 | 21.26 | 20.79 |
| Suppressed FPs count | 1630 | 2744 | 7305 | 2744 | 1630 | 1630 | 1630 | 1594 | 1636 | 1600 |
| Suppressed TPs count | 0 | 1 | 37 | 0 | 1 | 0 | 0 | 0 | 0 | 0 |

FIG. 17

SYSTEM AND METHOD FOR CLASSIFYING DATASETS TO GUIDE ACTION

TECHNICAL FIELD OF THE INVENTION

The present invention relates generally to the classification of data, more specifically to the classification of datasets using machine learning, and taking action based on such classification.

BACKGROUND OF THE INVENTION

Actions may be taken or alerts generated, for example regarding customer data, based on classification. The automated modification of thresholds and scores for such thresholds to achieve a classification with a higher accuracy is a complex problem since it requires the optimization of parameters such as threshold size, score value adjustment or a combination thereof. The lack of impact simulations on amended classifications means that changing more than a few scores (e.g. out of the thousand of parameters) is generally considered to be unmanageable.

When classifying data, rule-based classifications can generate a high number of false positive alerts, which has a cost impact as resources are spent investigating these false positives.

A high volume of false positives may lead to inaccurate classification of data and improper action taken or improper alert, for example the creation of false alerts based on inaccurate classification, and may overwhelm alert investigators and can detract them from their ability to focus on genuine true alerts.

Thus, there is a need for a solution that allows for classifying datasets, e.g. to identify true and false alerts in datasets.

SUMMARY OF THE INVENTION

Embodiments of the invention may improve the technology of dataset classification, by for example intelligently creating input to an artificial intelligence model, e.g. in order to generate new threshold sets for the categorization of datasets that reduce the number of false positive categorizations. Improvements and advantages of embodiments of the invention may include identifying data connections between different datasets, e.g. between customer datasets and third party datasets, such as datasets which have been involved in fraudulent activities or in money laundering activities. Embodiments may more efficiently perform fraud detection and identify data connections between different datasets.

In one aspect, the present invention allows automatically assessing relationships between data items of two or more datasets. For example datasets for a customer which belong to different sources, e.g. a dataset of a transaction database and a dataset of an address database.

Improvements and advantages of embodiments of the invention may include optimizing rule-based decision making in the processing of datasets and reducing the generation of false alerts.

In one aspect, the present invention allows automatically identifying suspicious activities in the categorization of datasets and dynamic adjustment of thresholds based on changes in rule-based decision making.

One embodiment includes a method of classifying datasets, the method including: submitting alert data items of one or more datasets to a machine learning (ML) model, wherein the alert data items of each dataset include: an alert rule that initiated an alert for the dataset including a first set of thresholds, one or more data values assessed by the first set of thresholds in the generation of the alert, and an alert categorization of the alert selected from a group consisting of: a true positive categorization and a false positive categorization; assessing, by the ML model, combinations of the alert categorization in relation to the one or more data values and the alert rule; generating, by the ML model, a second set of thresholds for the one or more data values, wherein the second set of thresholds has a reduced false positive categorization of the alerts compared to the first set of thresholds; and updating the alert rule to include the second set of thresholds.

One embodiment includes assigning, by the ML model, scores to the generated second set of thresholds.

In one embodiment, the generation of the second set of thresholds includes increasing the true positive categorization of generation of the alerts compared to the first set of thresholds.

One embodiment includes applying the second set of thresholds for the rule in the categorization of new datasets.

In one embodiment, the ML model includes a decision tree algorithm.

One embodiment includes adapting the one or more data values to the second set of thresholds.

One embodiment includes ranking the second the of thresholds based on generated threshold values.

In one embodiment, the ML model generates two or more second sets of thresholds for the alert rule and determines the second set of thresholds for the alert rule by selecting the second set of thresholds which has the lowest false positive categorization of the alerts out of the two or more second sets of thresholds.

In one embodiment, selecting the second set of thresholds includes selecting the second set of thresholds which has the highest true positive categorization of the alerts out of the two or more second sets of thresholds.

One embodiment includes selecting a number of threshold groups for the second set of thresholds.

In one embodiment, the threshold groups for the second set of thresholds include an escalation alert, a standard alert and a hibernation alert.

In one embodiment, the alert rule is used to block a customer account related to the dataset in case that an alert is initiated for the dataset.

One embodiment may include a system for classifying datasets, the system including: a computing device; a memory; and a processor, the processor configured to: submit alert data items of one or more datasets to a ML model, wherein the alert data items of each dataset include: an alert rule that initiated an alert for the dataset comprising a first set of thresholds, one or more data values assessed by the first set of thresholds in the generation of the alert, and an alert categorization of the alert selected from a group consisting of: a true positive categorization and a false positive categorization; assess, by the ML model, combinations of the alert categorization in relation to the one or more data values and the alert rule; generate, by the ML model, a second set of thresholds for the one or more data values, wherein the second set of thresholds has a reduced false positive categorization of the alerts compared to the first set of thresholds; and update the alert rule to include the second set of thresholds.

One embodiment may include a method of dynamically categorizing customer datasets, the method including: submitting categorization data items of a plurality customer datasets to a ML model, wherein the categorization data items of each dataset of the plurality of customer datasets include: a categorization rule that initiated a categorization for the customer dataset comprising a first set of ranges, wherein the categorization is selected from a group consisting of: a true positive categorization and false positive categorization, and one or more data values assessed by the first set of ranges in the generation of the categorization; determining, by the ML model, combinations of the categorization in relation to the one or more data values and the categorization rule; generating, the ML model, a second set of ranges for the one or more data values, wherein the second set of ranges has a reduced false positive categorization of the categorizations compared to the first set of ranges; and replacing the first set of ranges with the second set of ranges.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A depicts a flowchart of methods of classifying datasets, according to some embodiments of the present invention.

FIG. 3B depicts second part of the flowchart of methods of classifying datasets, according to some embodiments of the present invention.

FIG. 4 is an illustration of example thresholds and scores of a threshold and score table and three sets of thresholds and scores for updated thresholds and scores, according to some embodiments of the present invention.

FIG. 15 is a schematic illustration of a SAM alert interface, according to some embodiments of the present invention.

FIG. 16 depicts an alert prioritization, e.g., a final classification of alerts based on predictive scoring, according to some embodiments of the present invention.

FIG. 17 shows a summary of ten simulation of threshold sets and a determination of false positive and true positive alert categorization, according to some embodiments of the present invention.

Figure 1:
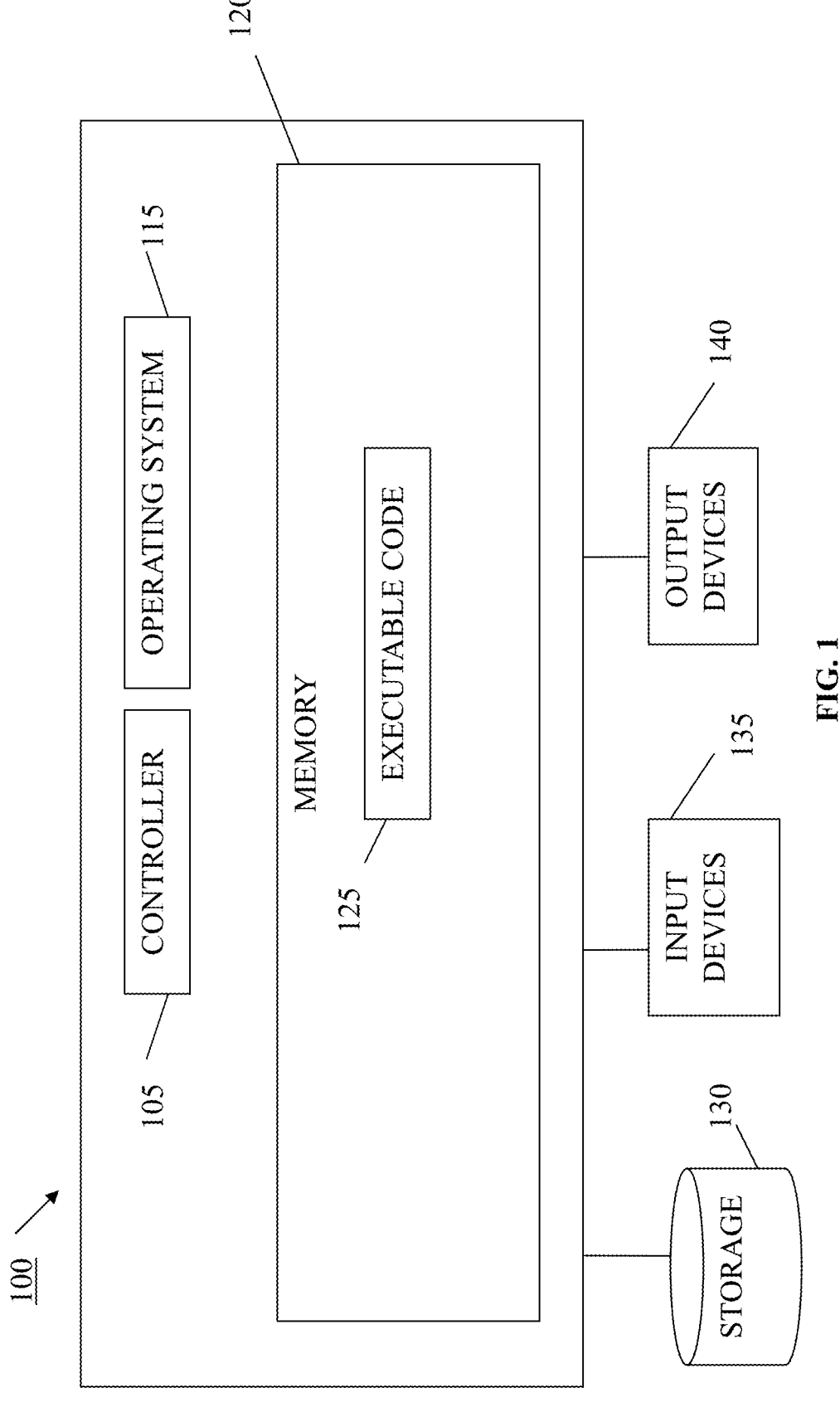
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms.

Embodiments disclosed herein can be used in any domain or field where alerts may be generated or actions taken based on the classification of datasets, e.g. in healthcare in medical diagnostics. A decision tree algorithm may be used to generate and/or update thresholds in rule-based diagnostic systems to improve the accuracy in the detection of diseases, e.g. to raise an alert for a specific disease when a data value of a dataset lies above a threshold value for the disease. Generating new threshold sets may reduce the number of false positive categorizations in medical tests, ensuring that patients are not misdiagnosed with conditions they do not have, and thereby avoiding unnecessary anxiety for patients and unsuitable treatment methods.

Embodiments disclosed herein may be used in the field of manufacturing, such as quality control. A decision tree algorithm may be applied to quality control processes in manufacturing to generate new sets of thresholds for defect detection in production lines. By minimizing false positive categorization, a new set of thresholds may ensure that alerts are only raised for datasets which contain truly defective items. This can reduce waste and required rework in the manufacturing of new items and may allow maintaining a high product quality.

Embodiments disclosed herein may be used in the field of environmental monitoring, specifically in the monitoring of air quality. A classification of datasets may be improved by generating new threshold values for detecting harmful levels of pollutants in the air. The generation of threshold sets with a reduced false positive categorization of datasets compared to an initial set of thresholds may allow providing a more accurate alert classification of air quality. For example, a new set of threshold may ensure that alerts are only triggered when a harmful level of pollutants is monitored and may reduce false positive categorization of datasets, thus avoiding unnecessary alerts that may have resulted from false positive categorization of datasets based on an initial set of thresholds.

Embodiments disclosed herein may be used in the field of customer support, e.g. in the automated provision of customer support. A ML algorithm, e.g. a decision tree algorithm, may be used to optimize a threshold set which is used to classify datasets of customers who have contacted an automated customer support system. For example, datasets of customers having contacted a customer support can be classified based on the type of inquiry detected. Such classification of datasets may allow the separation of customer queries into queries which do not require human intervention and queries which require human intervention. For example, alerts may be generated for customers linked to datasets which require human intervention. The generation of new thresholds may allow the reduction of the number of false escalations, and may improve customer satisfaction by ensuring timely and appropriate responses and may improve the workload of customer agents by raising a request for human intervention when it is required.

Embodiments disclosed herein may be used in the field of retail, e.g. in inventory management. A ML algorithm, e.g. a decision tree algorithm, can be used in inventory management systems to optimize the thresholds for raising alerts, e.g. alerts for reordering stock based on sales patterns and inventory levels. An updated threshold set may allow reducing the false positive categorization of datasets representing items of a stock. An increased categorization of datasets may allow determining with a higher accuracy whether or not a stock alert should be raised, e.g. an alert to reorder an item when the number of items falls below a threshold value. This may ensure that stock is replenished with a greater accuracy, e.g. compared to a previous threshold set for restocking and may reduce overstocking and out-of-stocking events.

Each of these example applications illustrate how the generation of new threshold sets using a ML algorithm can be utilized to improve the accuracy and efficiency of the classification of datasets across various industries by reducing the number of false positive categorizations in rule-based systems.

A "dataset" may include a set of data items, e.g. details such as transaction details of, or details describing, a customer. Datasets may describe other entities. For example, data items present in a customer dataset can be data items such as an alert score, variables for expressing a rule and data values for transactions. Data values for transactions may include for example the sum of money withdrawals (ATM_Out) via an automated teller machine (ATM) or the sum of money deposits to an account via an ATM (ATM_In) for a specific time period, e.g. one month for an individual customer. Datasets may be stored in a database. Some data items, e.g. identifiers such as tax identification numbers may allow identifying a customer. Some data items may be alert data items and may include an alert or categorization rule for a dataset including a set of thresholds. For example, an alert rule, also referred to herein as a categorization rule, may be a logic rule that allows the separation of a group of datasets from the remaining datasets based on a data value of a data item within a dataset, e.g. an alert rule may be based on the data item "trust score" and may read "generate an alert for datasets which have a trust score of 50 and lower". For example, a trust score of a customer and a threshold for a trust score may be 0-50 indicating that the customer is not trustworthy and a threshold for a trust score may be >50-100 indicating that a customer is trustworthy. A dataset may include alert data items such as one or more data values, e.g. a trust score for a customer A of 20 and a trust score for customer B of 78. A dataset may include an alert categorization for an alert, e.g. a trust score of 20 for customer A may be categorized as not trustworthy and an alert may be triggered. In the case that an alert was triggered and the alert was found to be correctly raised, the alert may be considered as a true positive categorization of the alert. In the case that an alert was triggered and the alert was found to be incorrectly raised, the alert may be considered as a false positive categorization of the alert.

A "classification of a dataset" may include the determination of an alert or no alert for a dataset. Other categorizations may be produced. A classification of a dataset leading to an alert or no alert may proceed by comparing one or more data values to a set of thresholds. A set of thresholds may include the allocation of data values to a specific classification for a specific alert rule. Classifying may include matching a data value of a dataset to a threshold of a set of thresholds indicating whether or not such a match leads to the generation of an alert for a pre-set rule.

ML models may, for example, include Large Language Models (LLM) such as Generative Pre-Trained Transformer (GPT), Bidirectional Encoder Representations from Transformers (BERT), Pathways Language Model (PaLM) and the like, (artificial) neural networks (NN), decision trees, regression analysis, Bayesian networks, Gaussian networks, genetic processes, etc. Additionally or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

In practice, an LLM or NN, or NN learning, can be simulated by one or more computing nodes or cores, such as generic central processing units (CPUs, e.g., as embodied in personal computers) or graphics processing units (GPUs such as provided by Nvidia Corporation), which can be connected by a data network. A NN can be modelled as an abstract mathematical object and translated physically to CPU or GPU as for example a sequence of matrix operations where entries in the matrix represent neurons (e.g., artificial neurons connected by edges or links) and matrix functions represent functions of the NN.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. data preparation module 502, scale generator 506, and modules in FIGS. 2, 3, 5, 7, 8, 9, 10, 12, 13, 14, may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3A and FIG. 3B, or other figures, or other methods, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
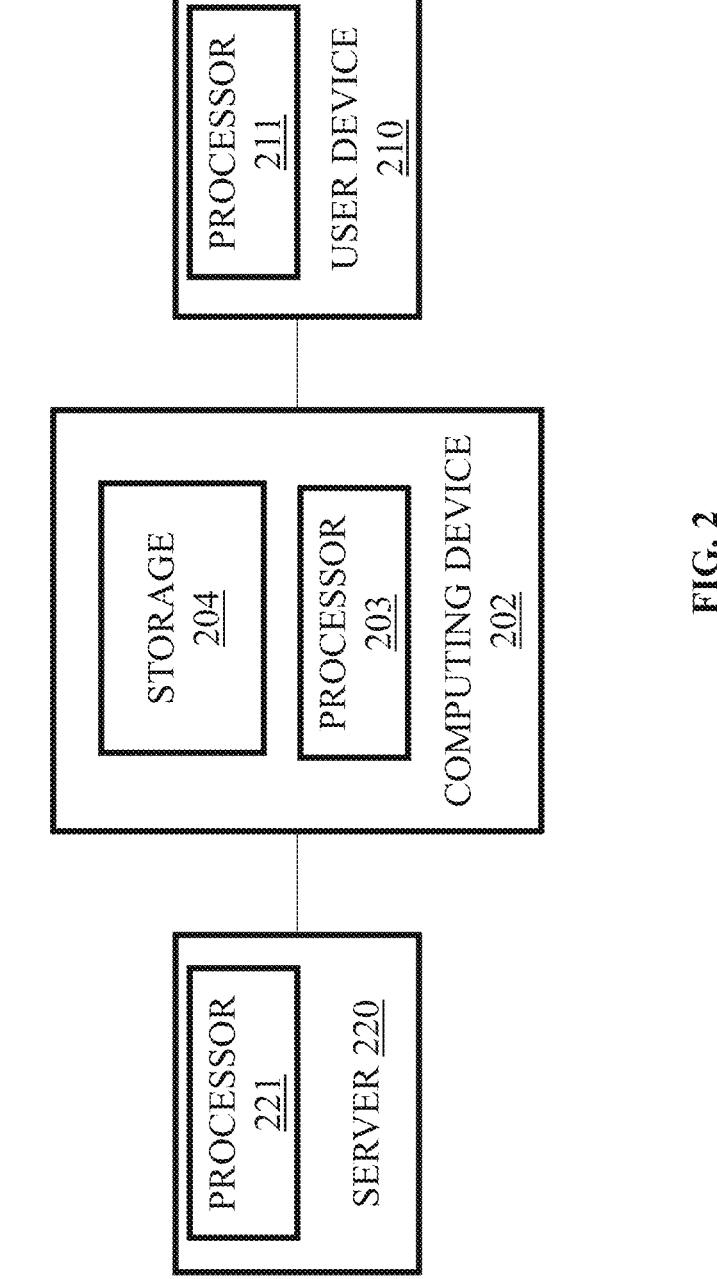
FIG. 2 is a schematic drawing of a system for classifying datasets, according to some embodiments of the invention.

FIG. 2 is a schematic drawing of a system 200, according to some embodiments of the invention. System 200 may include a computing device 202 including a processor 203 and storage 204. Computing device 202 may be connected to an user device 210 that includes processor 211. Computing device 202 may be connected to a server 220 including processor 221.

Computing devices 100, 202, 210 and 220 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 100, 202, 210, and 220 may include one or more input devices, for receiving input from a user (e.g., via a pointing device, click-wheel or mouse, keys, touch screen, recorder/microphone, or other input components). Computers 100, 202, 210 and 220 may include one or more output devices (e.g., a monitor, screen, or speaker) for displaying or conveying data to a user.

Any computing devices of FIGS. 1 and 2 (e.g., 100, 202, 210 and 220), or their constituent parts, may be configured to carry out any of the methods of the present invention. Any computing devices of FIGS. 1 and 2, or their constituent parts, may include a data preparation module 502, a scale generator 506, application 804, or another engine or module, which may be configured to perform some or all of the methods of the present invention. Systems and methods of the present invention may be incorporated into or form part of a larger platform or a system/ecosystem, such as agent management platforms. The platform, system, or ecosystem may be executed using the computing devices of FIGS. 1 and 2, or their constituent parts. A processor such as processor 203 of computing device 202 processor 211 of device 210, and/or processor 221 of computing device 220 may be configured to submit or input alert data items of one or more datasets to a ML model. Alert data items of a dataset may include: an alert or categorization rule that initiated an alert for the dataset including a first set of thresholds, one or more data values assessed by the first set of thresholds in the generation of the alert, and an alert categorization of the alert selected from a group consisting of: a true positive categorization and a false positive categorization. For example, an alert or categorization rule may read "generate an alert for a transaction amount of a customer when a transaction amount lies above a threshold value" and may include a first set of thresholds for example, two thresholds: "transaction amount between 0 and $1000—no alert" and "transaction amount >$100—generation of an alert". A data value may read: transaction amount $1200 and an alert categorization may read: true positive categorization. In a second example, an alert rule may read "generate an alert for a transaction amount of a customer when a transaction amount lies above a threshold value" and may include a first set of thresholds for example, two thresholds: "transaction amount between 0 and $1000—no alert" and "transaction amount >$100—generation of an alert". A data value may read: transaction amount $600 and an alert categorization may read: true negative categorization of the alert.

For example, datasets may also include personal information of or describing a customer, e.g. data items such as postal addresses, banking information, or tax identification or any form of data related to transactions or used in online banking. Other information may be included in a dataset. A processor such as processor 203 of computing device 202 processor 211 of device 210, and/or processor 221 of computing device 220 may be configured to assess, by the ML model, combinations of the alert categorization in relation to the one or more data values and the alert rule. For example, a ML model may attempt combinations of an alert categorization into true positive, false positive, true negative, or true positive based on data values and an alert rule. For example, three datasets A, B, C and D may be assessed by an alert rule, also referred to herein as a categorization rule, which reads "generate an alert for a transaction amount of a customer". Dataset A may have a true positive categorization for a transaction amount of $400, dataset B may have a true negative categorization for a transaction amount of $300, dataset C may have a false positive categorization for a transaction amount of $350 and dataset D may have a true positive categorization for a transaction amount of $500. In this case, a ML model may assess a set of thresholds which reduces the number of false positive and false negative categorization results. In this case, a threshold may be adjusted for the false positive categorization for dataset C. A processor such as processor 203 of computing device 202 processor 211 of device 210, and/or processor 221 of computing device 220 may be configured to generate, by the ML model, a second set of thresholds for the one or more data values, wherein the second set of thresholds has a reduced false positive categorization of the alerts compared to the first set of thresholds. A new threshold set, e.g. including a first threshold: transaction amount between 0 and $370-no alert and transaction amount >$370—generation of an alert. Using this new threshold set, dataset C may lead to a true positive categorization and remaining datasets A, B and D remain their true positive or true negative categorization. A processor such as processor 203 of computing device 202 processor 211 of device 210, and/or processor 221 of computing device 220 may be configured to update the alert rule to include the second set of thresholds. For example, for a rule "generate an alert for a transaction amount of a customer", a threshold set may be updated from a first threshold set, having two thresholds $0-$500 and >$500 to a second threshold set having two thresholds "$0—$370" and ">$370".

FIG. 3A and FIG. 3B collectively show a flowchart of an example method 300 of classifying datasets, e.g. data updating threshold sets for the assessment as to whether or not an alert may be generated for one or more datasets based on an alert rule also referred to herein as a categorization rule. In an example, method 300 may be used to automatically assess alert generations. Datasets may be received from storage of a computing device, e.g. user device 210, or computing device 202. According to some embodiments, some or all of the steps of the method are performed (e.g., fully or partially) by one or more of the computational components, for example, those shown in FIGS. 1 and 2.

The classification or categorization of datasets based on threshold sets may be dynamic. A dynamic classification or categorization may allow generating threshold values which may be adjusted periodically based on analyzed classifications or categorizations of datasets, e.g. to increase the fraction of correctly classified or categorized datasets and reduce the number of incorrectly classified or categorized datasets.

In operation 302, alert data items of one or more datasets may be submitted to a machine learning (ML) model, wherein the alert data items of each dataset include: an alert rule that initiated an alert for the dataset comprising a first set of thresholds, one or more data values assessed by the first set of thresholds in the generation of the alert, and an alert categorization of the alert selected from a group consisting of: a true positive categorization and a false positive categorization.

Figure 6A:
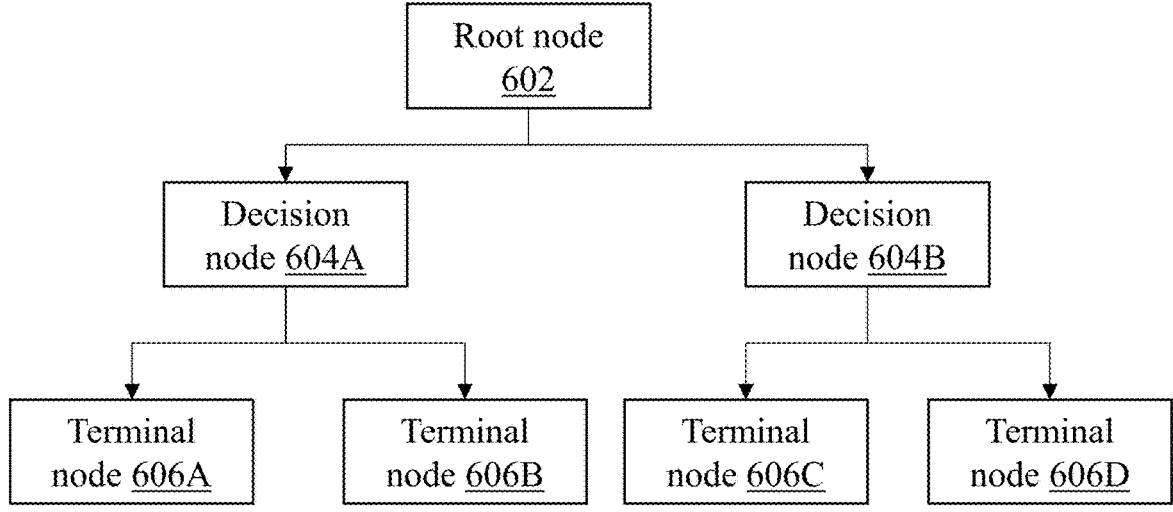
FIG. 6A is an example decision tree forming part of the ML model in the alert categorization in relation to the one or more data values and the alert rule, according to some embodiments of the present invention.
Figure 6B:
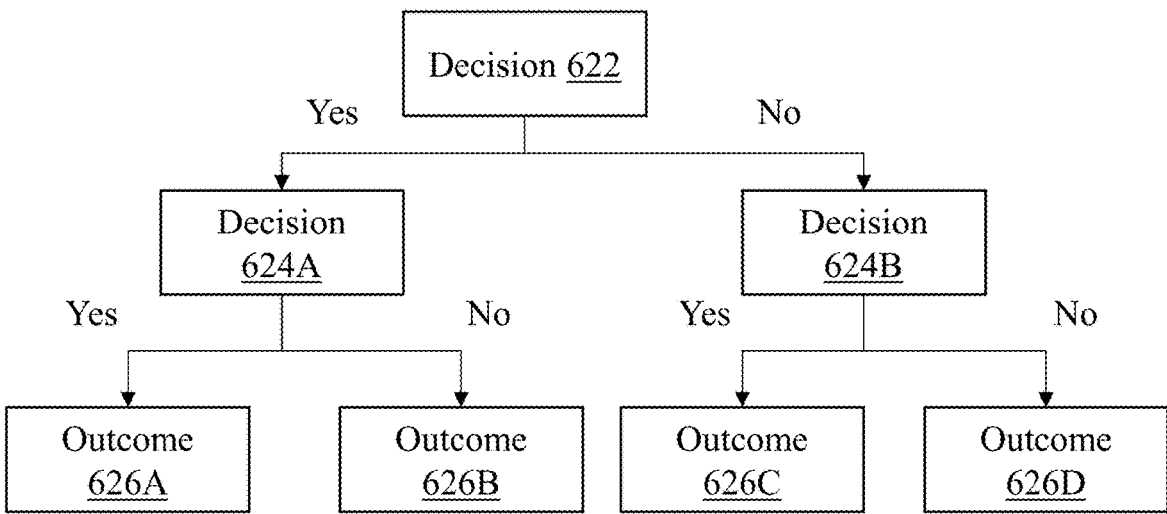
FIG. 6B is an example decision tree forming part of the ML model in the alert categorization in relation to the one or more data values and the alert rule, according to some embodiments of the present invention.

For example, the ML models may include a decision tree algorithm, e.g. a decision tree as shown in FIG. 6A or 6B. For example, a decision tree algorithm may be a machine learning algorithm that uses a decision tree to make predictions for thresholds or scores. It may follow a tree-like model of decisions and their possible consequences. The algorithm may work by recursively splitting the data into subsets based on generated thresholds at each node of the tree.

In operation 304, a ML model may assess combinations of the alert categorization in relation to the one or more data values and the alert rule. For example, a ML model may assess a set of thresholds which reduces the number of false positive and false negative categorization results for previously obtained datasets.

In operation 306, a ML model may generate or output a second set of thresholds for the one or more data values, wherein the second set of thresholds has a reduced false positive categorization of the alerts compared to the first set of thresholds. A second set of thresholds may include new thresholds for data values that belong to a specific alert rule, e.g. an alert rule may be "number of transactions to an unknown recipient" and data values may be 3 transactions for customer A, 5 transactions for customer B and 9 transactions for customer C.

The generation of a second set of thresholds may include increasing the true positive categorization of generation of the alerts compared to the first set of thresholds. A true positive categorization may be an outcome where a ML model correctly predicts a positive categorization, e.g. the generation of an alert for a dataset. A true negative categorization may be an outcome where a ML model correctly predicts a negative categorization, e.g. the generation of no alert for a dataset. A false positive categorization may be an outcome where a ML model incorrectly predicts the positive class, e.g. the generation of an alert for a dataset. And a false negative categorization may be an outcome where a ML model incorrectly predicts the negative class, e.g. the generation of no alert for a dataset.

One or more data values and/or scores may be adapted to the revised, second set of thresholds. For example, a data value or score may be set on a customer satisfaction scale between 0-50, wherein low customer satisfaction is indicated by a value from 0-15, medium customer satisfaction is indicated by a value between 16 and 40, and high customer satisfaction is indicated by a value between 41-50 and may have a value of 25. When new thresholds for a customer satisfaction scale are generated, a customer satisfaction scale may have values between 0-100, wherein low customer satisfaction is indicated by a value from 0-35, medium customer satisfaction is indicated by a value between 36 and 82, and high customer satisfaction is indicated by a value between 83-100. Accordingly, a customer satisfaction value of 25 may be adapted, e.g. based on the revised thresholds. For example, a value of 25 may be calculated to have a value of 50 for revised thresholds and may indicate a medium customer satisfaction.

A ML model may generate two or more second sets of thresholds for the alert rule and determines the second set of thresholds for the alert rule by selecting the second set of thresholds which has the lowest false positive categorization of the alerts out of the two or more second sets of thresholds. For example, a set of thresholds A may have a false positive indication of 20% of all categorizations and a set of thresholds B may have a false positive indication of 5% of all categorizations, threshold set B may have the lowest false positive categorization in the assessment of alerts out of the two threshold sets A and B and may be selected as a new threshold set for a rule.

For example, a second set of thresholds may include selecting the second set of thresholds which has the highest true positive categorization of the alerts out of the two or more second sets of thresholds. For example, a set of thresholds A may have a true positive indication of 90% of all categorizations and a set of thresholds B may have a true positive indication of 85% of all categorizations, threshold set A may have the highest true positive categorization in the assessment of alerts out of the two threshold sets A and B and may be selected as a new threshold set for a rule.

A number of threshold groups for the second set of thresholds may be selected. For example, a threshold set may have 1, 2, 3, 4 or more thresholds. The number of thresholds may be set by selection or may be predefined, e.g. in case that a rule can only result in a positive or negative outcome, e.g. the generation of an alert or no alert, the number of thresholds is defines as 2.

For example, FIG. 17 includes an example for the generation of ten threshold sets SIM-SC-1 to SIM_SC_10 and provides a count of suppressed true positive categorizations and suppressed false positive categorization for each threshold set. In the example provided in FIG. 17, a new set of thresholds may be identified by a) identifying threshold sets with the lowest suppressed true positive categorization, and b) for identified threshold sets under a) the identification of the threshold set which shows the highest rate in the suppression of false positive categorizations leading to SIM_SC-9 with 0 suppressed true positive categorizations and a suppressed false positive rate of 21.26 as the best threshold set out of the ten threshold sets.

In operation 308, an alert rule may be updated to include a new set of thresholds. Updating of an alert rule may include amending a categorization for a data value assessed by a rule for previously recorded datasets or for data sets which may be categorized in the future. Updating of an alert rule may be important, e.g. to business needs, e.g. the introduction of a new product leading to a new threshold to reflect a possibility to select the new product, or may be important to account for a fact that a contact center may have additional capacity to handle a larger number of alerts leading to the possibility that even alerts with a reduced alert value may be processed by the contact center.

FIG. 4 is an illustration of example thresholds and scores of a threshold and score table 405 and three sets of thresholds and scores for updated thresholds and scores. For example, for a set of thresholds and scores shown in table 405, a new, updated set of thresholds may include updated scores (table 410) compared to table 405, or updated threshold values (table 415) compared to table 405, or a combination of updated threshold values and updated scores (table 420) compared to table 405. The generation of an updated set of thresholds and/or the generation of updated scores, e.g. assigning scores to the updated set of thresholds may proceed via submitting alert data items to a machine learning model, e.g. to a reinforced learning algorithm. A reinforcement learning algorithm may allow the generation of a set of thresholds and/or updated scores via trial and error submissions of data items to a ML algorithm and identifying optimal actions in the generation of a set of thresholds, e.g. by using a decision tree algorithm as illustrated in FIGS. 6A and 6B, and/or updated scores generated by an agent assigning scores by experiencing rewards and/or punishments within their environment, e.g. an agent 1102 using a computing device such as computing device 210 as shown in a reinforcement learning system illustrated in FIG. 11. A new set of thresholds may be ranked based on generated threshold values. For example, generated thresholds >200, 30 to 200, and 15 to <30 may be ranked based on their threshold values: 1. threshold: 15 to <30, 2. threshold: 30 to 200, 3. threshold: >200.

A new set of thresholds for a rule may be applied in the categorization of new datasets. A new dataset may be a dataset which is classified or categorized after threshold sets of an alert rule are updated, e.g. a dataset related to a transaction of a customer or a dataset of a customer which undergo a classification after the rule update. For example, datasets may be classified once an alert rules has been updated to include a new set of thresholds which may differ from an initially used set of thresholds.

Threshold groups for a set of thresholds may include different types of alerts based on their thresholds, e.g. an escalation alert, a standard alert and a hibernation alert as shown in table 2. A categorization of a dataset to an alert may have an effect on a customer account linked to the dataset. For example, an alert rule may be used to block a customer account related to the dataset in case that a specific alert, e.g. an escalation alert, is initiated for the dataset.

A machine learning model used in the application of a connection analysis prompt may be, for example, a decision tree algorithm.

Previously generated threshold sets may be updated periodically. For example, a threshold set X for a rule R may be updated periodically, e.g. every week, every month or every year.

Figure 5:
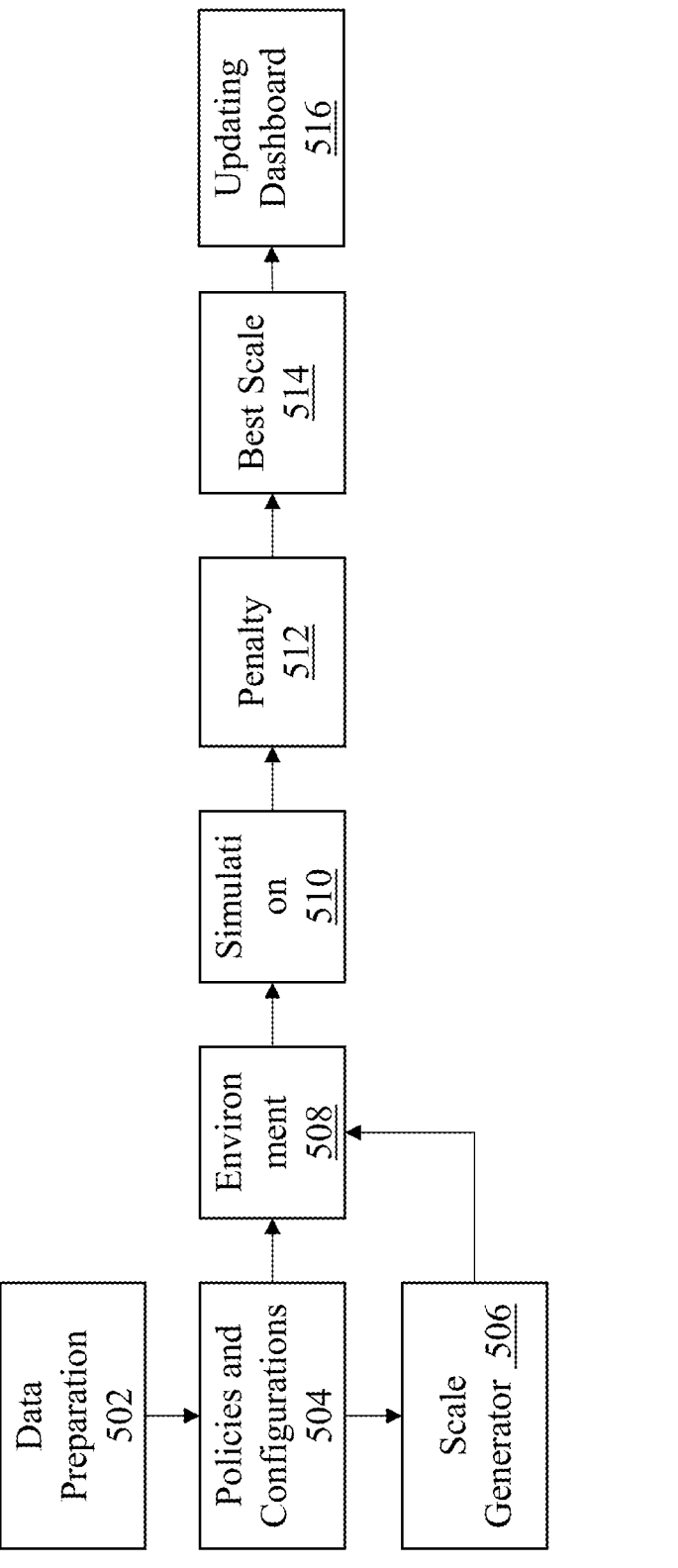
FIG. 5 is an illustration of exemplary operations in the classification of datasets, according to some embodiments of the invention.

FIG. 5 is an illustration of exemplary operations in the classification of datasets. In operation data preparation 502, alert data items for one or more datasets are received. Datasets may include a true positive or a false positive categorization of an alert. Datasets may also include an alert rule that initiated an alert for the dataset including a first set of thresholds, one or more data values assessed by the first set of thresholds in the generation of the alert. For example, data items may include data values, e.g. a score for a data item which provides context regarding its severity, e.g. a score for a data item customer satisfaction may be 8 on a customer satisfaction scale between 0 to 100 and may provide context that a low customer satisfaction is present in this dataset.

In operation 504, policies and configurations for managing datasets may be detected. For example, policies and examples for one or more datasets may be included in a configuration file. An excerpt of an example configuration file including several policies may read:

```
            excludes_rules = [ ]

exclude_pop_groups = [ ]

prod_score_rules = [ ]

string_scale_rules = ['AML-EFC-RSK-LVL-A-039-CVA",
        "AML-EFC-NON-PHY-A-004-CVA',
        AML-EFC-RSK-ENT-A-038-CLP']

prod_alert_threshold = 40.0

TP_expected_threshold = 40.0

FP_expected_threshold = 39.0

TP_suppressed_penalty = −1000.0

FP_suppressed_penalty = 1.0 binning_depth = 3 score_values = list(np.sort(np.arrange(5, 100, 10)))
```

Parameter exclude_rules may set a list of rules that may be excluded from a categorization process. This may be useful for rules that may be considered well-calibrated or for those that are not suitable for adjustment. Parameter exclude_pop_groups may allow specifying data items, e.g. population groups (potentially user segments), that should be excluded from tuning. This can be helpful in the case that specific data values with unique characteristics would not benefit from general updating. Parameter Prod_score_rules may identify a set of rules, whose thresholds may be compared to data values of datasets in the categorization of a dataset. E.g., the production score may reflect historical performance or feedback from analysts. String_scale_rules may define a list of rules where the score factor is represented as a string rather than a numerical value. Updating for these rules may require a different approach compared to numeric data values. Parameter Prod_alerting_threshold may set a threshold value or score above which an alert is triggered in production. Tuning may aim to ensure that alerts are raised only when a data value or score exceeds this threshold value. Parameter TP_expected_threshold may define an expected data value or score threshold for true positive (TP) alerts. Ideally, TP alerts should have scores greater than 40 (on a scale from 0-100) according to this configuration. This can help guiding the updating process to prioritize identifying genuine threats. Parameter FP_expected_threshold may define an expected score threshold for false positive (FP) alerts. Ideally, FP alerts should have scores less than 40 (on a scale from 0-100). Updating of threshold values may minimize the generation of false positives by focusing on rules that differentiate between genuine threats and benign events. Parameter TP_suppressed_penalty may define a penalty applied if a true positive alert is suppressed (e.g. not raised). In this case, a value of 1000 is subtracted from the reward during the tuning process. This may discourage the updating process from making adjustments that might suppress valid alerts. Parameter FP_suppressed_penalty may define a reward adjustment when a false positive alert is suppressed. Here, a value of 1 may be added to the reward. This can incentivize an updating process to identify adjustments that reduce false positives. The lower the difference between these penalty values (TP penalty vs. FP reward), the more conservative the updating approach of alert rules may become, prioritizing avoiding missed threats over reducing false positive categorizations. Parameter Binning_Depth may define a maximum depth allowed for the decision tree used for finding the bins. Parameter Score_values may specify a range of scores to be evaluated during the tuning process. In this example, the tuning will experiment with scores from 5 to 100 with an interval of 10. This allows the algorithm to identify the optimal threshold value for each rule based on historical data and desired outcomes.

Scale Generator 506 may generate new threshold sets for scoring alerts, e.g. using a ML model such as a decision tree. A decision tree may be a flowchart-like tree structure where each internal node denotes the feature, branches denote the rules and the leaf nodes denote the result of the algorithm. It may be a versatile supervised machine-learning algorithm, which is used for both classification and regression problems.

FIG. 6A is an example decision tree forming part of the ML model in the alert categorization in relation to the one or more data values and the alert rule, according to some embodiments of the present invention. A decision tree may include a root node 602. Root node 602 may include branches, e.g. decision nodes 604A and 604B which are further branched to terminal nodes 606 or to other decision nodes 604. Nodes which do not branch of into other nodes may be set as terminal nodes 606.

A decision tree algorithm may analyze submitted alert data items of one or more datasets. For example, alert data items may be historical alert data. A decision tree algorithm may assess combinations of an alert categorization in relation to one or more data values and an alert rule. For example, a decision tree algorithm may identify patterns that differentiate between true positive and false positive alerts. Based on these patterns, a decision tree may construct a branching structure, e.g. as shown in FIG. 6A, where each may represent a potential decision point based on an alert's characteristics.

By following each unique path through the tree, thresholds sets can be derived. Each threshold may encompass an alert that shares similar characteristics based on the decision tree's analysis, resulting in a more sophisticated and data-driven approach to threshold generation compared to pre-defined threshold, e.g. pre-defined ranges.

FIG. 6B is an example decision tree forming part of the ML model in the alert categorization in relation to the one or more data values and the alert rule, according to some embodiments of the present invention. FIG. 6B shows a decision tree which includes three decisions 622, 624A, 624B. A decision may be based on a threshold suggestion. E.g., terminal nodes may include a threshold as a final outcome, e.g. outcomes 626A, 626B, 626C and 626D.

As shown in FIG. 6B, a decision tree with two primary decision points (decision 624A and decision 624B), and each decision point further branches into two possible outcomes 626A or 626B and 626C or 626D, resulting in a total of four possible paths through the decision tree.

By following each unique path through the decision tree, leaf nodes may be accessed, which in this context, represents distinct thresholds. Each threshold may encompass a type of alert, e.g. hibernation queue, standard queue, escalation queue which shares similar characteristics based on the decisions made along the path through the tree.

To create a final set of thresholds, e.g. thresholds outcome 1, outcome 2, outcome 3, outcome 4, leaf nodes may be extracted from the decision tree. However, for a more effective scoring system, thresholds of a threshold sets may be sorted in ascending order. This sorting may ensure that thresholds at the top represent alerts with a higher likelihood of being genuine threats (true positives), while thresholds towards the bottom may encompass alerts with a lower likelihood of being threats (potentially false positives).

This data-driven approach to threshold set generation, derived from the decision tree's analysis, can offer several advantages over pre-defined static threshold sets. It may allow for a more nuanced scoring system that adapts to the specific characteristics of alert data.

An example input provided to a ML model, e.g. a decision tree algorithm, may include previous alert data items of one or more datasets including an alert rule and data values, and a generated categorization for each of the one or more datasets, e.g. whether or not an alert raised for a dataset resulted in a true positive, false positive, true negative or false negative alert.

A machine learning model, such as a decision tree model, may be instructed by input data provided in a training process. Historical alert datasets, including data items, e.g. a data value "S_1.105.1", and a status of an alert, (e.g. whether or not a categorization of a data value into a threshold resulted in a true positive or false positive categorization), may be submitted to the ML model. A trained decision tree may analyze submitted inputs, e.g. submitted datasets, to identify patterns and relationships in datasets, and may create rules that allow the classification of datasets into thresholds and the generation of alerts. For example, input data may include historical transaction data labeled as "fraudulent" or "legitimate," in combination with data items such as "transaction amount", "transaction location", "time of transaction", and "number of transactions in a day" and data values for the data items.

For example, in the training of a ML model, a decision tree may learn the identification of patterns in the training data such as:

"If the transaction amount is greater than $10,000 and the transaction location is different from the usual location, then it is likely to be fraudulent."

"If the number of transactions in a day is more than 5 and the time of transaction is late at night, then it is likely to be fraudulent."

"If the transaction amount is less than $100 and the transaction location is the usual location, then it is likely to be legitimate."

An output provided by a ML model may include a set of thresholds, e.g. threshold values, which can be sorted in ascending order and may define new thresholds for a rule-based categorization of datasets, e.g. to reduce false positive alerts. An example output provided from a ML model, e.g. a decision tree algorithm may read: ['if (VALUE_NUMBER_S_1.105.1<=90.0) and (VALUE_NUM­BER_S_1.105.1>12.0) and (VALUE_NUMBER_S_1.105.1<=86.0) then class: (probability: 98.65%) |based on 222 samples', 'if (VALUE_NUMBER_S_1.105.1<=90.0) and (VAL­UE_NUMBER_S_1.105.1>12.0) and (VALUE_NUMBER_S_1.105.1 86.0) then class: e (probability: 87.5%) |based on 8 samples', 'if (VALUE_NUMBER_S 1.105.1 90.0) then class: e (probability: 60.0%)|based on 5 samples', 'if (VALUE_NUMBER_S_1.105.1<=90.0) and (VALUE_NUMBER_S_1.105.1<=12.0) and (VALUE_NUMBER_S_1.105.1 10.0) then class: e (probability: 50.0%) based on 4 samples', 'if (VALUE_NUMBER_S_1.105.1<=90.0) and (VALUE_NUMBER_S_1.105.1<=12.0) and (VALUE_NUMBER_S_1.105.1<=10.0) then class: (probability: 100.0%) based on 2 samples']

Output by a ML model may include a range of threshold values which may be ordered in ascending order. A decision tree may generate new threshold for alert rules, for example:

"If the transaction amount is greater than $10,000 and the location is different, then class: fraudulent (probability: 95%)."

"If the number of transactions in a day is more than 5 and the time is late at night, then class: fraudulent (probability: 90%)."

"If the transaction amount is less than $100 and the location is usual, then class: legitimate (probability: 98%)."

An output of a ML may be in the form of new thresholds, including threshold values such as "$10,000," "5 transactions," and "late at night." Threshold values may be sorted and applied to the rule-based engine's thresholds to reduce false positive categorization of datasets.

For example, an example output from a ML model may have the following threshold set for the categorization of datasets:

"if (transaction_amount<=10000.0) and (transaction_location!=usual) then class: fraudulent (probability: 95%)|based on 200 samples"

"if (num_transactions_day>5) and (time_of_transaction=late_night) then class: fraudulent (probability: 90%)|based on 150 samples"

"if (transaction_amount <=100.0) and (transaction_location=usual) then class: legitimate (probability: 98%)|based on 500 samples"

Using this example threshold set including threshold values, customer datasets may be classified into classes. For example, the threshold set may be used to accurately identify datasets which include potentially fraudulent transactions and may reduce the number of false positive classifications. This may increase the certainty that alerts are only generated for datasets which include truly suspicious transactions.

The decision tree may create a series of branches based on different criteria (e.g., decisions). Each unique path through these branches may lead to a leaf node, which can be considered a threshold.

In the above example scenario, a decision tree analysis may result in four terminal paths, each with a specific decision rule. These rules may involve thresholds for certain alert attributes.

Four threshold values may be 10, 12, 86, and 90 and may represent the decision thresholds identified by the decision tree. These thresholds may act as split points, dividing a range of possible values for an alert's attribute into distinct thresholds.

Referring back to FIG. 5, environment module 508 may be part of a decision tree algorithm and may include decision making and learning processes which are based on feedback received to trial and error processes.

An environment module 508 may be relevant in the generation of thresholds, e.g. by assessing decisions based on rewards or penalties based on taken decisions. For example, rewards and penalties may serve as feedback mechanisms, indicating whether or not a decision, e.g. the generation of a threshold or a set of thresholds is closer or further away from a desired outcome. For example, a ML model may assess whether or not a generated threshold set reduces the false positive categorization of the alerts compared to another set of thresholds. A reward structure may be designed to suppress false positives and penalize for suppressing true positives.

A stimulation module 510 may include a stimulation function. A stimulation function may assess combinations of alert categorizations in relation to one or more data values and an alert rule. For example, an assessment of combinations may assess one alert rule at a time. Under each rule, a stimulation module may take one threshold at a time and tests data values through all the set of score and calculate the new score for each alert. In this way for each combination new scores may be generated for each alert.

By applying a threshold to each alert data value, a stimulation function may calculate a new threshold for every alert. This may create a scenario where a multitude of new thresholds is generated for each alert, each alert may correspond to a different threshold adjustment within a specific rule. In essence, the stimulation function may simulate how an adjustment of thresholds and score within a single rule would impact the scoring of all alerts in the system.

A penalty function 512 may be used to adjust a second threshold set to the Below is an example excerpt of a penalty function:

$$def\, \text{penalty}(df):$$
$$p = df.\text{apply}(\text{lambda}\, x : np.\text{where}(x['\text{ALERT FINDING}''] == '\text{Issue}',$$
$$np.\text{where}(x[\text{RULE\_SCORE}] >= x['\text{Expected}'], 0.0,$$
$$\text{FP\_suppressed\_penalty})), \text{axis} = 1).\text{sum}()$$
$$\text{return}(p)$$

Following the exploration conducted by the stimulation function, a penalty function may assess an impact of the newly generated scores on the system's ability to identify genuine threats (True Positives-TPs) while minimizing false alerts (False Positives-FPs).

Figure 7:
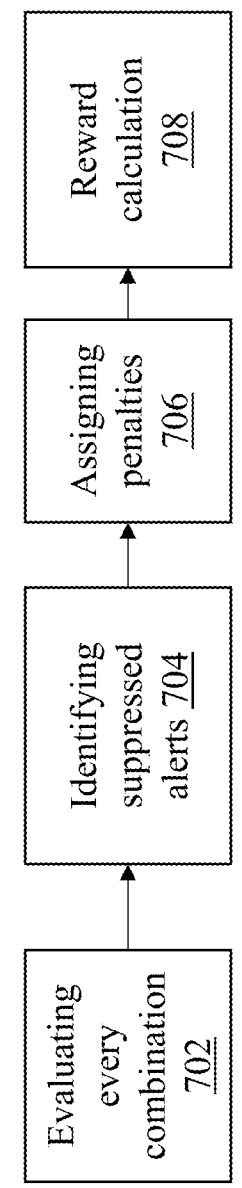
FIG. 7 shows example operations in the assessment of combinations of the alert categorization in relation to the one or more data values and the alert rule by a ML model, according to some embodiments of the present invention.

FIG. 7 shows example operations in the assessment of combinations of the alert categorization in relation to the one or more data values and the alert rule by a ML model, according to some embodiments of the present invention.

In operation 702, every combination of outcomes for a decision tree. e.g. a decision tree shown in FIG. 6A or 6B may be evaluated to obtain a comprehensive assessment of all potential threshold sets.

A penalty function may not settle for a single score adjustment but can provide a more comprehensive analysis for all possible sets of thresholds. A penalty function may examine each combination of new scores generated by the stimulation function. For each alert, numerous new data values may be generated, each corresponding to a different threshold and data values may be adjusted within various rules. A penalty function may systematically consider all combinations to gain a holistic understanding of how these adjustments in threshold values would collectively affect the categorization of alerts.

In operation 704, suppressed alerts may be identified and the impact of true positive and false positive categorization may be assessed. In this case, a suppressed alert may be a false positive alert previously generated for a threshold set which is desired to be suppressed by a new threshold set generated by the decision tree model. For each combination of new values, a penalty function may identify how many alerts have been suppressed. This suppression, however, can affect two distinct categories of alerts:

True Positives (TPs): These may be legitimate alerts that genuinely indicate a potential threat. However, with the new score combination, their scores might be inadvertently suppressed, causing the system to overlook these crucial warnings. This scenario may represent a critical concern, as missing true threats can have serious consequences.

False Positives (FPs): These may be inaccurate alerts that mistakenly flag harmless events as threats. The new score combination might unintentionally filter out these FPs by suppressing their scores. While reducing FPs may be generally desirable, it may not result in missing an alert in response to a genuine threat.

In operation 706, penalties may be assigned to the thresholds. Penalties may reflect the severity of suppression of true positive or false positive results.

Based on the number of suppressed alerts (both TPs and FPs) identified for a specific combination of new scores, a penalty function may assign a penalty score. This score can serve as an indicator of the severity of the suppression in that particular scenario.

Higher penalty for suppressed TPs: The penalty function may typically assign a higher penalty for suppressing TPs compared to FPs. This may reflect the nature of identifying genuine threats. Missing true threats can have significant security implications, outweighing the inconvenience of categorizing a dataset as a false alert.

Configurable penalty weights: The penalty function may offer flexibility by enabling the configuration of weights for TP and FP suppression, e.g. to adjust a penalty calculation to specific needs of a user.

In operation 708, rewards may be calculated to identify a balance between suppressed true positive and false positive results.

Once the penalty score is calculated for a particular combination of new scores, the system may determine an overall reward for a set of thresholds. This reward may reflect how well a specific threshold adjustment balances accuracy and efficiency Referring back to FIG. 5, module best scale 514 may allow the generation of a second set of threshold via comparison of generation threshold sets and selection of a threshold set by identifying a set of thresholds that leads to the highest reward. This combination may represent the best scale for a scoring system. Below is an example for a reason combination considered optimal, high reward=optimal balance: The combination with the highest reward may signify the best trade-off between:

Maximizing true positive (TP) categorization: Minimizing the suppression of genuine threats to ensure effective threat detection.

Minimizing false positive (FPs) categorization: Reducing unnecessary alerts that can overwhelm security personnel while maintaining the ability to detect real threats.

In conclusion, the interplay between the stimulation function and the penalty function may allow the generation of threshold set for the one or more data values, by identifying a threshold set which has a reduced false positive categorization of the alerts using an alert scoring optimization process. By systematically exploring different threshold and score adjustments and evaluating their impact on TP and FP suppression, a system can identify the best scale that offers the optimal balance between TP and FP alerts.

Updating dashboard 516 may provide an visual interface for the assessment of threshold sets in the selection of a new threshold set for a rule.

Figure 8:
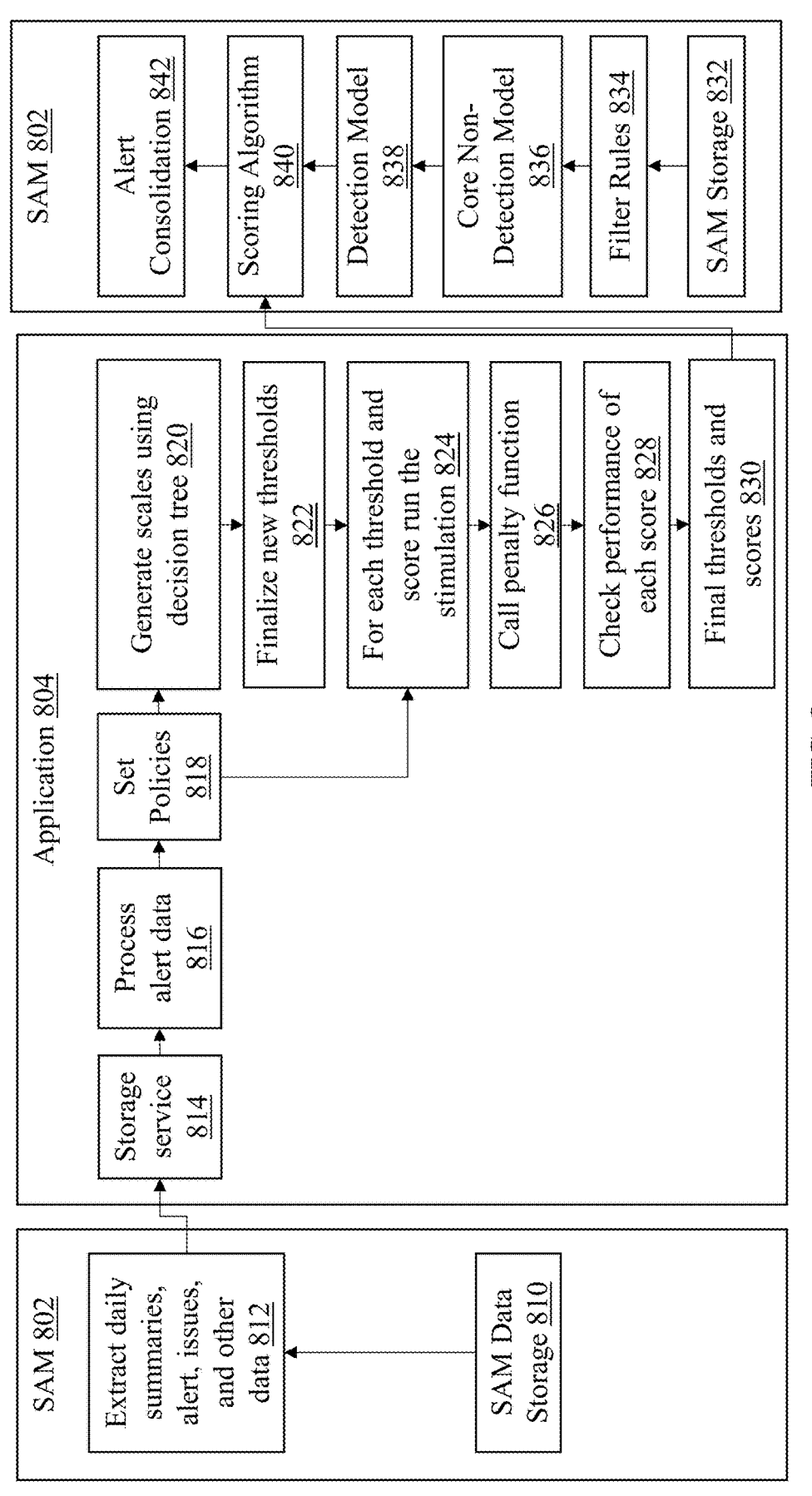
FIG. 8 illustrates a software architecture diagram implemented in a suspicious Activity Monitoring (SAM) system which may be used in the classification of datasets, according to some embodiments of the present invention.

FIG. 8 shows a software architecture diagram implemented in a suspicious Activity Monitoring (SAM) system. In operation 802, a SAM block for the data extraction may be used for updating a score scale (812):

1. Extract data from an analytics service data source: This may include retrieving data from an Amazon Web Services (AWS) data source by Amazon Inc. The specific data source may include customer information, historical transactions, and transaction information.

2. Process alerts data: This stage may involve processing data from alerts and may include summaries, alerts themselves, and other relevant data.

3. Extract daily summaries, alerts, issues and other data: In this step, daily summaries, alerts, and other data items may be extracted from the analytics service data source.

Files may be located within the following example folder structure (810):

Data required for the updating may be a mix of XDT files coming from production and outputs from Jenkins or Jupyter notebook pipelines that a user may need to run in order to produce the files. Other data may be used.

In addition to these client data sets, there may be a number of configuration files and bug fix files that can be updated or populated to process data and make corrections. A set of default bug fix files can be used to correct most known issues, however if additional problems are encountered on a specific project, the files can be updated, and the new versions can be used on other projects going forward.

These configuration files may be technical (e.g., bug fixes, file locations, etc.) or business oriented (max caps, policies, etc.), therefore they can be modified by a user, e.g. a data analyst.

In operations forming part of application 804, data extraction and processing may be broken down into operations and modules 814-830:

Storage service 814 may collect relevant datasets from a surveillance system, or other system. A surveillance system may be a system which allows the identification of fraudulent transactions and may allow the identification of customers which are linked to fraudulent transactions. This data may include daily summaries of transactions, alerts triggered by the system, any identified issues, and other relevant information.

In operation 816, alert datasets may be processed. An embodiment may focus on the extracted alerts data and may involve tasks such as:

1. Categorizing the alerts based on type or severity.

2. Enriching the data with additional details from customer information or historical transactions.

3. Cleaning and formatting the data to ensure consistency and proper use in the next steps.

In operation 818, policies may be set, e.g. to define rules that may be used to filter transactions and identify potentially fraudulent transactions. These policies might consider factors such as:

1. Transaction amount exceeding a certain threshold.

2. Unusual location for the transaction compared to the customer's history.

3. High frequency of transactions within a short period.

In operation 820, a scoring algorithm/decision tree may be generated: based on the extracted data and defined policies, a scoring algorithm may be created, e.g. a decision tree. A ML model, e.g. a decision tree may assign a data value to each transaction, representing the likelihood of it being fraudulent. The data value may be based on a combination of factors weighted according to their importance in identifying fraud.

In operation 822, new threshold sets may be generated for one or more data values, e.g. using a decision tree algorithm, e.g. a decision tree as shown in FIG. 6A or 6B.

In operation 824, combinations of alert categorization may be assessed by assessing each threshold set in relation to data values. This step involves testing the effectiveness of the scoring model. The system might divide the data into thresholds based on different data values, e.g. transaction amount or location. It then simulates how the model performs on each threshold, analyzing how well it differentiates between fraudulent and legitimate transactions.

In operation 826, a penalty function may be applied to the generated combinations of alert categorizations, e.g. to assign a penalty score to the categorization of datasets of transactions based on the results of the simulation from step 818.

In operation 828, the performance of each categorization into threshold sets may be evaluated, e.g. by comparing a generated score for each threshold set, e.g. to assess how the threshold sets generated by the scoring algorithm and decision tree.

In operation 830, a threshold set and optionally new score factors may be updated, e.g. by assigning a new threshold set and optionally a new score factor to an alert rule.

In operation 830, updating of an alert rule may proceed, e.g. using AWS SageMaker or Jupyter Notebook. Sage-Maker is an AWS machine learning service, and Jupyter Notebook is an open-source platform for data science. Both may also be used to develop and implement the scoring algorithm or decision tree mentioned in operation 820.

SAM module 802 may retrieve and use an updated set of thresholds and score scale, e.g. to calculate an alert score using new score scales, for each threshold of the new threshold set.

SAM Data Storage 832 may provide storage for datasets used in this process. Stored datasets, may be mostly transaction data of party which will apply alert calculation logic by passing it to filter 834, non-core detection 836, detection model 838 and scoring algorithm 840.

Filter rules 834 may determine which transactions/accounts/customers are not relevant for this solution. For example, there may be legal exemptions determined by regulation, or there may be internal exemptions determined within the organization. These may be filter rules that apply to the whole solution as opposed to model-specific filters that define the population for a particular model. Table 1 may be an example for a rule "filter accounts on accounts white list" which may suppress an alert generation for accounts that appear on a customer accounts' white list.

TABLE 1

| Model | AML-EXT (entity exemptions) |
|---|---|
| Rule Objective | Suppress alert generation for accounts that appear on the accounts' white list |
| Rule ID | AML-EXT-ACT-KEY-A-LST-EXT |
| Rule name | Filter Accounts on Accounts White List |
| Alert level | Account |
| Alert type | 10001 (Account Activity) |
| Rule type | filter |
| Evaluation level | account |
| Evaluation trigger | Daily activity |

Core non-detection models 836 may establish a basis for the detection models by managing datasets of customers, e.g. customer profiles, focus scores, lists, and other datasets. These models facilitate comparison and analysis of transactional data. For example, the models may rank client's entities (accounts and parties) as high focus based on various criteria that indicate increased risk.

For example an entity focus classification core model may identify a high-risk account due to for example three high focus attributes, or other attributes: non-resident alien, non-physical address and high risk country list domicile country. The score that may be assigned for each of the attributes may be for example 20 points. Therefore, a total high focus score for this account may be 60 points. When an alert is generated for this account as the result of any detection model, this score may be added to the detection score. If, for example, an excessive fund transfers detection rule identifies suspicious activity with a score of 30, an alert may be generated with a score of 90 (detection score of 30+entity focus score of 60). If this account had not been identified as a high focus entity, this alert would not have been generated due to the low suspicion level indicated by the low score of 30. The alert may be generated due to enhanced due diligence triggered by the high focus model.

Detection models 838 may affect the core models' infrastructure and multidimensional analysis to detect suspicious activity in datasets.

AML-SAM detection models may cover the activity domains such as:

Suspicious behavior analysis—this domain may include models that can identify behavior patterns that are known to be typical of money laundering activities or of attempts to avoid detection by the regulators. And can generate an alert when excessive incoming and/or outgoing cash/cash equivalent transactions are detected.

Unusual behavior analysis—this domain may include models that can identify behavior patterns that are unusual in comparison with the account's past behavior or in comparison with typical behavior of similar accounts. For example, historical behavior comparison which generates an alert when an established account may display a behavior different from its previously known patterns over a specified period.

Hidden links models—this domain may include models that identify links between two or more seemingly unrelated entities (accounts or parties), based on activity patterns or similar identity details.

For example, financial institutions in Switzerland may be required to report on cash transactions in new accounts whenever the transaction amount is greater than SF 100,000. In an embodiment a model may generate an alert for any transaction that meets this criterion.

For example, financial institutions in the U.S. may be required to report daily cash-equivalent transactions whenever the daily-accumulated transaction amount, for an account, is greater than $10,000. The model may generate an alert if the accumulated daily activities are higher than $10,000.

A scoring algorithm 840 may allow the prioritization of alerts based on the alert categorization of an alert and the generation of scores to the generated threshold sets.

Detection and alerting may be based on an examination of a customer's profile and detected suspicious activity. In the course of input transaction analysis, if certain pre-set conditions are met, an event may be triggered, scored and recorded internally. As additional similar events occur, the detection algorithm evaluates their cumulative impact in deciding whether or not to produce an alert.

One purpose of alert scoring may be to prioritize alerts based on their severity. Alert scoring may also be used in determining the best course of action for a dataset related to a transaction of a customer, which may be further investigation, contacting the customer, or blocking or holding the transaction pending an in-depth review. An AML-SAM solution may use several methods to assign a score to alerts generated by the detection models, thus enabling risk-driven analysis and handling. One embodiment may automatically take action or intervene as a result of the processing of datasets relating to customer transactions: For example, based on a generated alert for a transaction, one embodiment may automatically prevent the initiation of a customer transaction or prevent the completion of a customer transaction. Based on a generated alert for a transaction, one embodiment may allow the automatic execution of a customer transaction.

The progression of calculations, which make up the scoring process, can be categorized based on main stages such as:

Operation 1—Determining a rule score
    i. A first step of this stage may be assigning a separate score value for each score factor that is addressed by a rule.
    ii. The second step may be aggregating all score factor score values into one combined rule score.
Operation 2—Determining an alert score
    iii. This stage may begin by aggregating all rule scores that apply to a specific entity (e.g., account, party or logical entity).
    iv. The next step in the process may be adding, to the aggregated score, any score values from relevant core models (e.g., a score is added to the calculation if an account is associated with a high risk country).
    v. When appropriate, a score may be enhanced by the interactive learning process that evaluates the alert history of relevant entities and that allows for user interaction.
Operation 3—In the case that a score is high enough, one consolidated alert may be generated.

An alert consolidation module 842 may consolidate alerts that have been generated throughout the process. The AML-SAM system may merge alerts triggered by different detection models for the same party into a single alert. This combined alert also may have a consolidated score reflecting the severity from all contributing models. This may ensure that analysts receive only one alert per party, but only if at least one detection model identifies suspicious activity and the overall score surpasses a certain threshold.

This process may be designed to identify suspicious activity in customer transactions. The system may extract datasets which may include alert data items from various sources, may generate a scoring algorithm or decision tree to assess the risk of transactions, and may consolidate generated alerts.

The solution may analyze input transactions and may generate an alert if certain pre-set conditions are satisfied. To determine the severity of an alert, a score may be calculated considering multiple factors, such as excess over thresholds, deviation from norms etc.

The solution may typically group the exceptions generated by the detection scenario models into a single consolidated alert. The score of the combined alert may consolidate scores from all detection models. In this way, a user may receive one alert per party. In some cases, a user may only see an alert for an account when at least one detection model is triggered and if the score exceeds a threshold value.

Figure 9:
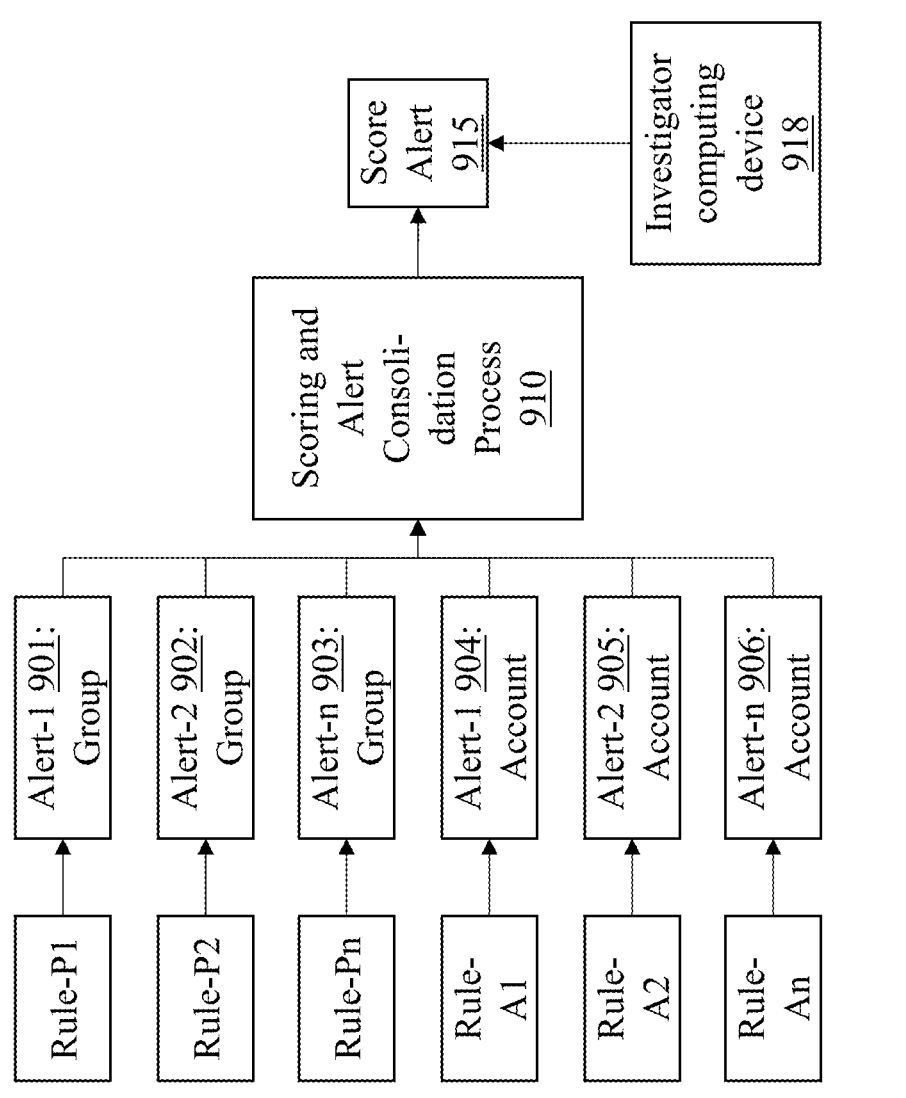
FIG. 9 is an illustration of an alert consolidation for a customer, according to some embodiments of the present invention.

FIG. 9 is an illustration of an alert consolidation for a customer. A set of alert rules, e.g. anti-money laundering rules, denoted by "n" in FIG. 9 may be designed to identify suspicious financial activity that could be related to money laundering. These alert rules may apply at two levels:

Account level: These alert rules may assess datasets of transactions for individual accounts of a customer for data values which lie above a threshold value for a set rule.

Group level: These alert rules may assess transactions across a group of linked accounts of a customer, for data values which lie above a threshold value for a set rule.

Rules $A^1$-$A^n$ may be rules that assess individual customer datasets and initiate an alert when a data value lies above a threshold value. Rules $P^1$_$P^n$ may be rules that assess datasets of linked accounts of a customer and initiate an alert when data values lie above a threshold value. Generated account alerts 904-906, group level alerts 901-903 and their scores may be used in the scoring and alert consolidation process 910. Alert consolidation process 910 may generate score alters 915 from alerts 901-906 and their scores, e.g. by summing scores for alerts over a set time period and comparison of summed scores with threshold values.

An embodiment may continuously assess transactions and their datasets against thresholds set in alert rules. For example, when a dataset of a transaction includes a data value which exceeds a threshold present in a rule, an alert may be generated. In a defined time period, e.g. throughout a day, multiple alerts can be generated for the same party at both account and group levels.

For a specific time period, e.g. for a month, all alerts generated within a time period may be consolidated, e.g. summed up, and may be applied to a scoring model. When the score of the consolidated alerts is greater than a pre-set threshold value, an alert may be raised and, for example, a transaction or a dataset of a transaction may be investigated by an investigator, e.g. using an investigator computing device 918 such as computing device 210 as shown in FIG. 2.

When an alert is initiated, it may indicate potential money laundering activity. An investigator may investigate a dataset of a transaction to identify issues which may have caused an alert. For example, an investigation may involve reviewing transactions, account details, and potentially contacting the customer for clarification.

An embodiment may allow the categorization of alerts, e.g. to proactively identify and investigate suspicious financial activities that could be indicative of money laundering. By combining anti-money laundering rules at account and party group levels, the system can gain a more comprehensive view of a party's financial transactions for specific time periods.

Figure 10:
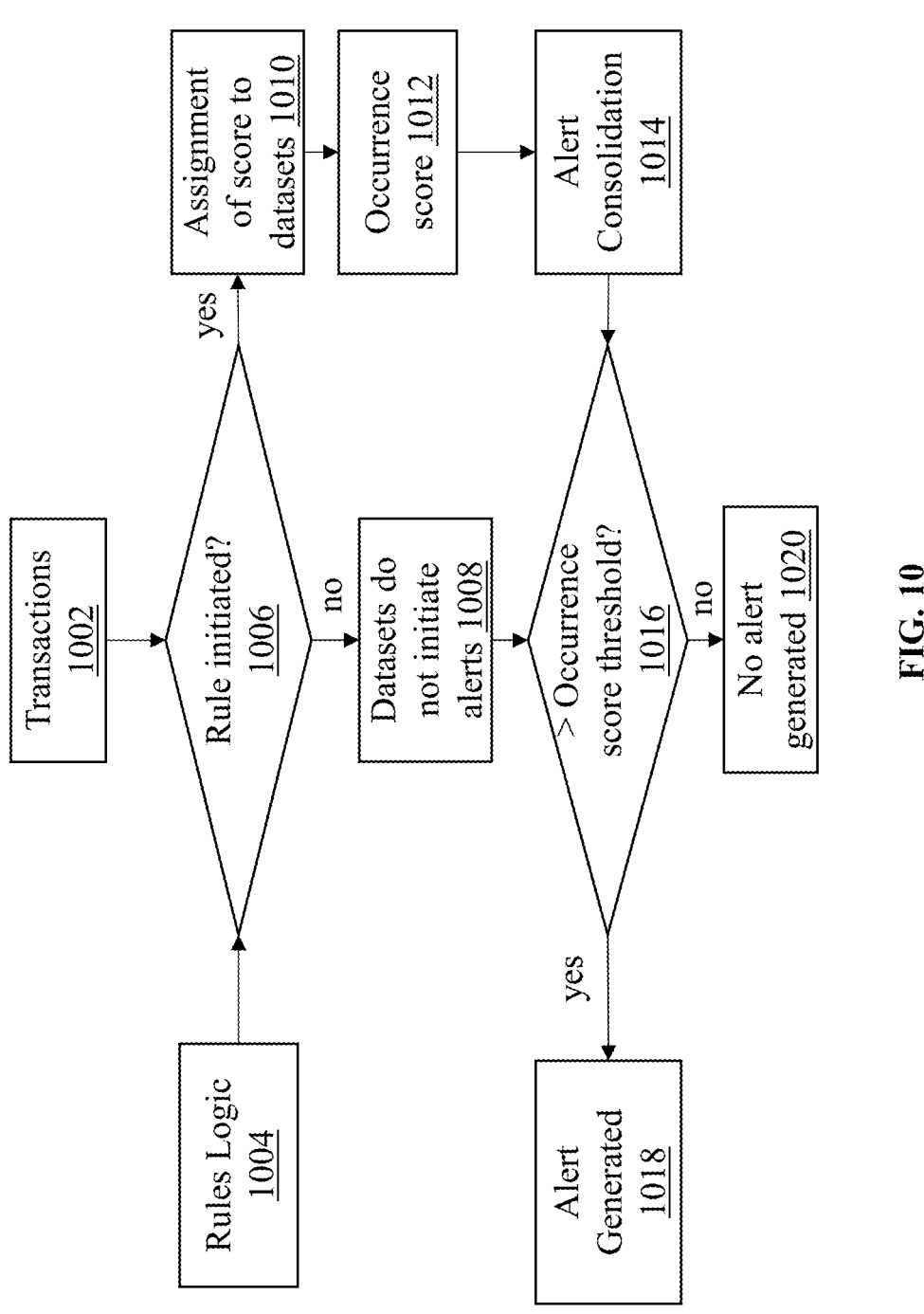
FIG. 10 is an example of alert generation process flow, according to some embodiments of the present invention.

FIG. 10 is an example of an alert generation process flow. FIG. 10 may reveal the presence of two thresholds:

A threshold for a data value which may determine whether or not a single transaction initiated an alert based on an alert rule. A score factor threshold may be a threshold which applies to a final score, for example a score factor threshold may be calculated based on scores which have been assigned to one or more data values of a dataset, e.g. after consolidating monthly issues and it may defines whether or not an alert is raised for further investigation.

Thresholds such as data value thresholds may be updated by a policy-driven updating process, which is a process in which data value thresholds may be updated which are present in datasets of a client to minimize false positive categorizations of datasets which can occur when an alert is initiated for a dataset which indicates money laundering activity but the alert is a false alert since no true money laundering activity has occurred.

Updating of thresholds such as score factor thresholds may be complex, since they may involve combination of data value thresholds in their overall risk assessment.

Rules logic 1004 may include one or more alert rules for the generation of alerts for datasets. Rules may include one or more of, for example, data values, e.g. in form of variables, operators, thresholds and risks scores. For example, rule 1 may read: X>100 and Y>=20 or rule 2 may read: A>5 or B<400. Transactions 1002 may include datasets which include data values, e.g. data values X and Y. In operation 1006, it is assessed whether or not a rule is initiated. In the case that data values of datasets lie below a threshold value, no alert may be initiated (operation 1008). In operation 1010, transactions 1002 may be assessed for the generation of alerts based on comparison of data values present in datasets with rules of a rules logic 1002. For example, dataset A may initiate an alert by triggering rule 1 based on data values X=300 and Y=25 and corresponding score values may have values of 20 and 10. For example, dataset B may initiate an alert by triggering rule 1 based on data values X=130 and Y=25 and corresponding score values may have values of 5 and 10. Scores for individual rules may be combined to an occurrence score value 1012. For example, for dataset A, score values of 20 and 10 may result in an occurrence score value of 30. For example, for dataset B, score values of 5 and 10 may result in an occurrence score value of 15. In alert consolidation operation 1014, occurrence scores for one or more datasets may be combined. For example, dataset A and B may reflect two instances in a month in which an alert for rule 1 was initiated. Occurrence scores 1012 may reflect how significant a rule, e.g. rule 1 was initiated, e.g. whether a rule was initiated by a threshold value being slightly above a threshold value or substantially above a threshold value. Consolidation of alerts 1014 may represent a summary of margines which indicates how significant a rule, e.g. rule 1, had been initiated over a certain period of time, e.g. one month. In the generation of a score alert it may be assessed whether or not a consolidated occurrence score 1014 lies above a threshold value (operation 1016). In the case that a consolidated occurrence score 1014 is higher than an occurrence score threshold, a score alert may be generated (operation 1018). In the case that a consolidated occurrence score 1014 is lower than an occurrence score threshold, a score alert may not be generated (operation 1020).

Figure 11:
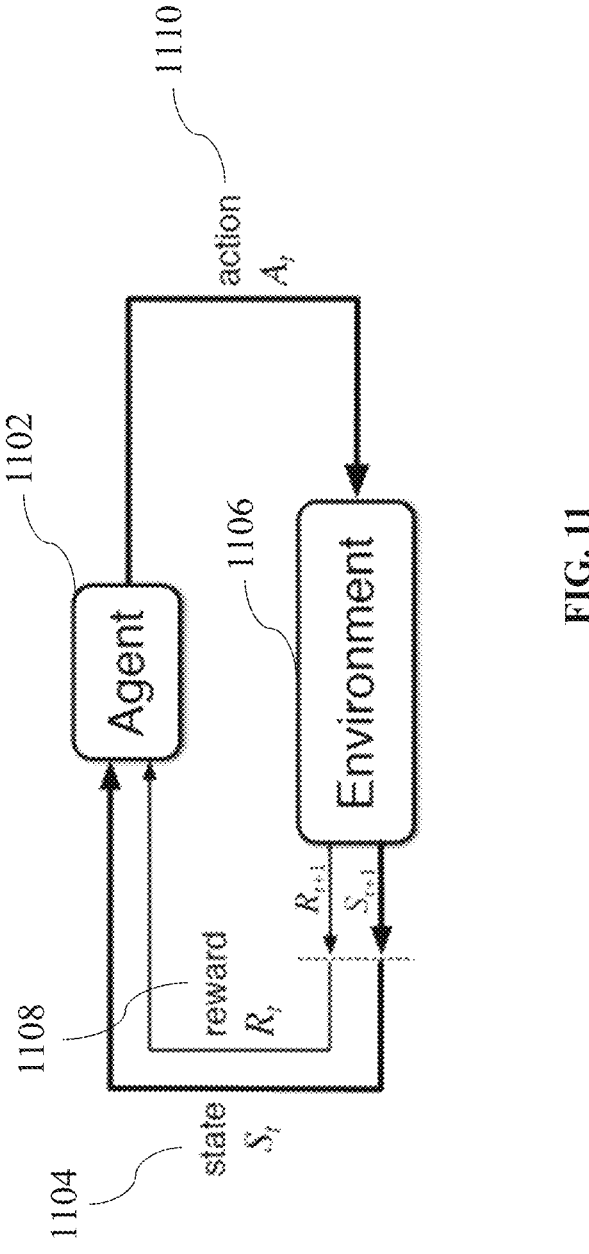
FIG. 11 is an example illustrating re-enforced learning of an agent, according to some embodiments of the present invention.

FIG. 11 discloses an example which illustrates re-enforced learning of an agent, e.g. an analyst. FIG. 11 may depict a reinforcement learning system with four key components: agent, state, reward, and environment.

An agent 1102, e.g. using a computing device such as computing device 202 or 210, may be a decision-making entity within the system. Agent 1102 may perceive the environment's state and may take actions to maximize its reward.

State 1104 may represent a current state of an environment 1106, which an agent perceives. The agent's decision-making may solely rely on the perceived state.

Reward 1108 may be a numerical feedback signal that agent 1102 receives after taking an action 1110 in a particular state.

Environment 1106 may be everything outside the agent 1102 that they interacts with. The environment 1106 may provide an agent with state observations and rewards in response to their actions 1110.

Reinforcement learning may be part of a machine learning model. By applying reinforced learning, agents 1102 may be self-trained on reward and punishment mechanisms to identify the best possible action 1110 to gain maximum rewards 1108 and minimum punishment through observations in a specific situation. It acts as a signal to positive and negative behaviors. An agent 1102 can perceive and interpret an environment 1106 in which the agent is placed, furthermore, it can take actions and interact with it.

Implementing reinforcement learning may allow to correct actions 1110 taken by an agent 1102 in different scenarios by using the concept of trial and error. For example, a reenforced learning algorithm may be trained on datasets involving real-life situations. Based on them, reinforcement learning may determine one or more actions 1110 for which the agent either receives rewards or penalties 1108. The overall aim of reinforcement learning may be to maximize the reward.

An agent 1102 may learn to take one or more actions 1110 based on their current state and the reward 1108 they receive from the environment 1106. Environment 1106 may determine the outcomes of the agent's action 1110 and may provide feedback in the form of a reward 1108. A reward 1108 may be a scalar value that reflects how well an agent 1102 generated a result.

Several ML algorithms may be used to train reinforcement learning agents, such as Q-learning, policy gradient methods, and actor-critic methods. These algorithms differ in how they estimate the expected cumulative reward 1108 and how they update an agent's policy.

The interaction between agent 1102 and environment may proceed as illustrated in the following operations:

Agent 1102 may perceive the current state 1104 of the environment 1106.

Based on the perceived state 1104, the agent 1102 may select an action 1110 to perform.

The agent 1102 may take the action 1110 in the environment 1106.

The environment 1106 may transition to a new state 1104 as a consequence of the agent's action.

Agent 1102 may receive a reward 1108 based on the state transition caused by its action 1110.

The loop repeats from the first operation.

Through this continuous loop of perceiving states 1104, taking actions 1110, and receiving rewards 1108, agent 1102 may learn to take actions that maximize its long-term reward.

Figure 12:
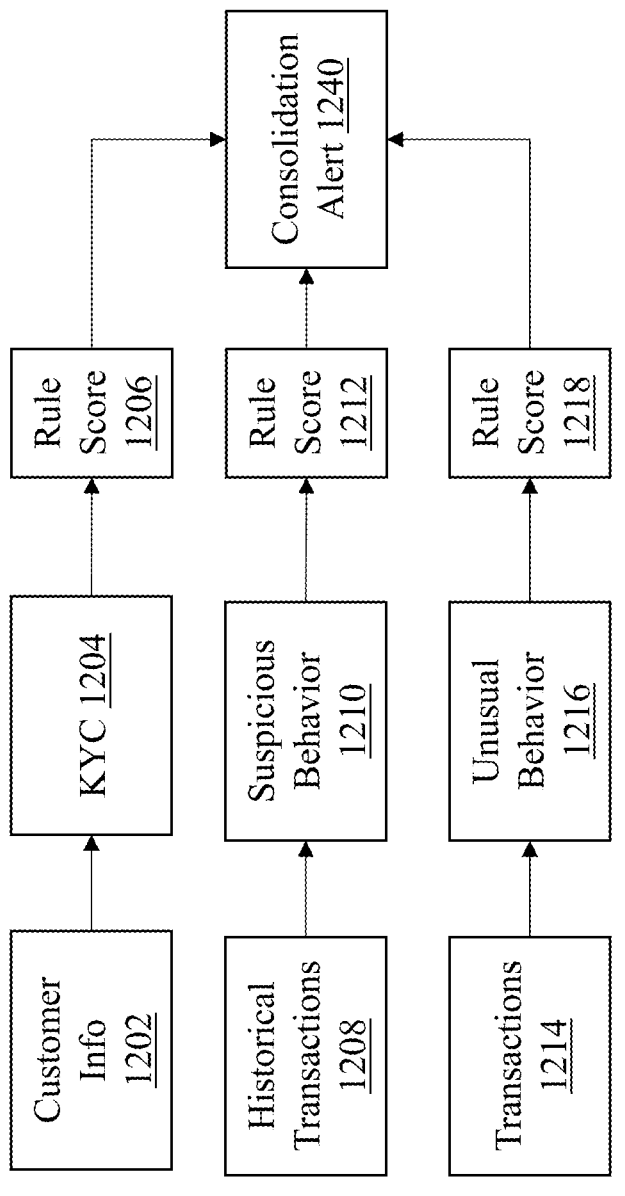
FIG. 12 illustrates an alert consolidation of alerts in the generation of an alert score, according to some embodiments of the present invention.

FIG. 12 illustrates an alert consolidation of alerts generated by detection models, e.g. detection model 838. Alerts generated by different detection models for the same customer may be combined into a single alert, also referred to herein as consolidation alert 1240. This combined alert 1240 may have a consolidated score reflecting the severity from all contributing models. This may ensure that analysts receive only one alert per party, but only if at least one detection model identifies suspicious activity and the overall score surpasses a certain threshold.

For example, customer information 1202 may lead to the generation of a score 1206 for a customer risk assessment (Know Your Customer (KYC)) 1204, historical transactions 1208 may lead to the generation of a score 1212 for rules related to suspicious behavior of a party 1210, and transaction details 1214 may lead to the generation of a score 1218 for rules related to unusual behavior 1216. A customer risk assessment KYC may involve verifying a customer's identity to prevent fraud, money laundering, and other illegal activities. KYC may include collecting and analyzing personal information, such as identification documents, e.g. passports, and financial data. This step may help financial institutions to assess the risk level of a customer and may ensure compliance with regulatory requirements. Scores 1206 for KYC, scores related to suspicious behavior 1212 or scores related to unusual behavior 1218 may be consolidated in a consolidated alert 1240 which may be provided to an investigator, e.g. a user such as a data analyst using computing device 202 or 210.

Figure 13:
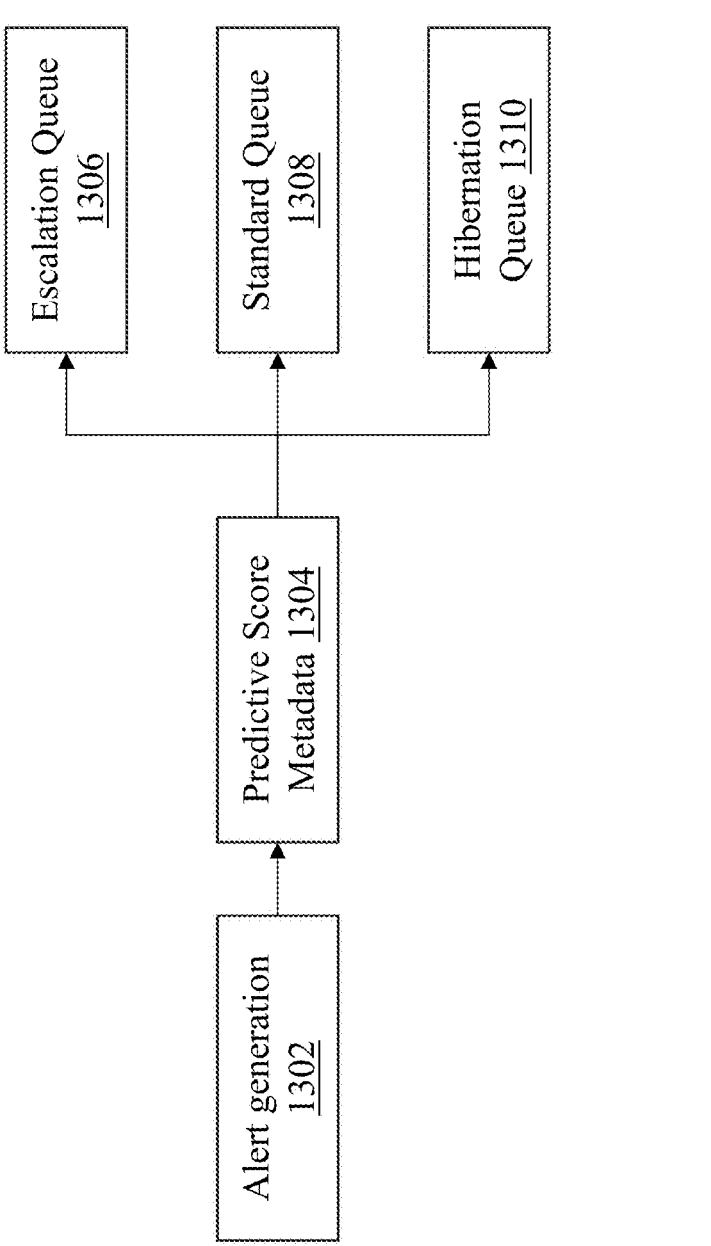
FIG. 13 illustrates an example alert prioritization for datasets, according to some embodiments of the present invention.

FIG. 13 illustrates an example alert prioritization for datasets. Output by a ML model, e.g. a predictive algorithms of detection model 838, may be a probability score for an alert which may be derived from predictive score metadata 1304. Scores may be arranged/ranked in descending order. Alerts associated with a high rank, e.g. which have been assigned to an escalation queue 1306, may be sent to a user, e.g. an investigator for the further investigation.

Predictive algorithms may generate an alert score, e.g. an alert sore between 0.0 and 1.0. and the higher the score the riskier the customer. Generated alerts 1302 for datasets may be classified into three alert types such as an escalation queue 1306, a standard queue 1308 or a hibernation queue 1310. In the case that an alert for a dataset may be assigned to an escalation queue 1306, the alert may investigated as highest priority and may be forwarded to an investigator, e.g. a user using computing device 202 or 210 for investigation and the transaction may be stopped until all issues are resolved. In the case that an alert for a dataset may be assigned to a standard queue 1308, the alert may be investigated as medium priority and may be forwarded to an investigator, e.g. a user using computing device 202 or 210 for investigation and a transaction linked to the dataset may be put on hold until the investigation by an investigator has finished. In the case that an alert for a dataset may be assigned to a hibernation queue 1310, the transaction linked to the dataset may not be reviewed by an investigator and a transaction may continue. However, the system may review the transaction for any suspicious activity that may cause a score to rise above the hibernation threshold and may prompt a review by an investigator.

Figure 14:
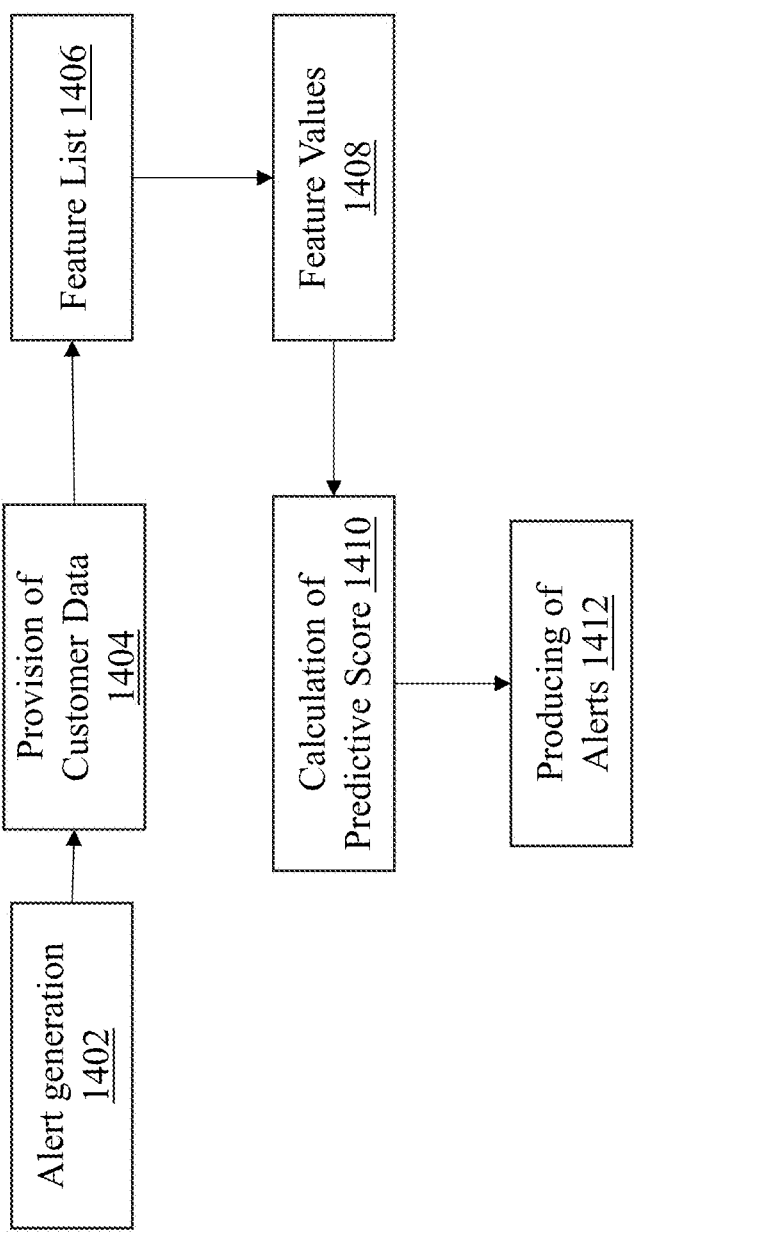
FIG. 14 is an example illustrating an update process of scores using predictive scoring, according to some embodiments of the present invention.

FIG. 14 is an example for a data flow and illustrates how scores may be updated based on predictive scoring.

A SAM alert generation module, e.g. SAM 802 shown in FIG. 802, may generate alerts and may send them to an analytics application which initiates ML model training and/or initiates a prediction of a score (operation 1402).

In operation 1404, a SAM may request predictive score metadata from an initiation application.

In response to operation 1404, in operation 1406, an analytics application may generate a feature list which may be required for the model prediction with correct data type and logic to retrieve datasets from the suspicious activity module.

In operation 1408, a SAM may send datasets, e.g. including data items which include data values, upon receival of a data item list from the initiation application. Data items and data values provided by the suspicious activity module may be used in the predictive scoring.

In operation 1410, an analytics application may calculate a predictive score. Upon receipt of the data items and data values from the suspicious activity module, data items and data values may be sent to a model building module where data items and data values may be used to generate an alert score/predictive score.

In operation 1412, an analytics application may provide predictive scores. Predictive scores may be separated into three categories, e.g. escalation queue, general queue and hibernation queue.

In operation 1414, scores may be updated based on suspicious activity module alerts, e.g. to display them to an analyst. A SAM alert 1500 may be shown in FIG. 15. An alert generation application may use both supporting and contradicting evidence to identify a suspicious activity of a customer and to calculate a predictive score present in a SAM alert. This score may help assessing a risk associated with the transactions in a business unit to be involved in a fraudulent transaction.

Example Outputs:

Using a ML model's probability score, alerts may be prioritized according to an escalation, standard and hibernate categories, and the routing may be groups as shown in table 2 shown below:

TABLE 2

| Categories | Classification | Alert % (example) |
|---|---|---|
| Escalation | SAR preparation | Top 1% alerts (highest scores) |
|  | Level 2 investigation | Next ~9% alerts |
| Standard | Level 1 investigation | Next ~60% alerts |
| Hibernate | Hibernate | Bottom 30% alerts (lowest scores) |

FIG. 16 shows an alert prioritization, e.g., a final classification of alerts based on a predictive score.

Tuning results from the alert prioritization shown in FIG. 16 indicate a completed study for existing customers and training data results may be evaluated to test the accuracy of the approach. Training data shown in FIG. 16 shows an example of alert routing via the classification of datasets into four thresholds: SAR preparation, Level 2 investigation, Level 1 investigation and Hibernate. For example, alerts for the classification "SAR preparation" may be included in a score threshold between 0.8138 to 0.9988 and have been classified based on 728 true positive classifications and 0 false positive classifications leading to a true positive rate of 27.41% and a false positive rate of 0%.

FIG. 17 shows a summary of ten simulation files and their results. Ten simulation files may be generated for score scale adjustment for financial institutions. For example, SIM_SC_1 may suppress 21% of false positive categorizations without suppressing any true positive categorizations.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of classifying datasets, the method comprising:

submitting, by a computer, alert data items of one or more datasets to a machine learning (ML) model that is a decision tree, wherein the alert data items of each dataset comprise: an alert rule that initiated an alert for the dataset comprising a first set of thresholds, one or more data values assessed by the first set of thresholds in the generation of the alert, and an alert categorization of the alert selected from a group consisting of: a true positive categorization and a false positive categorization;

assessing, by the ML model, by the computer combinations of the alert categorization in relation to the one or more data values and the alert rule;

generating, by the ML model, by the computer a second set of thresholds for the one or more data values, wherein the second set of thresholds has a reduced false positive categorization of the alerts compared to the first set of thresholds and wherein the second set of thresholds is based on reinforcement learning applied with the ML model, wherein the reinforcement learning is based on ranking the second set of thresholds based on generated threshold values;

updating, by the computer, the alert rule to comprise the second set of thresholds.

2. A method according to claim 1, further comprising assigning, by the ML model, by the computer, scores to the generated second set of thresholds.

3. A method according to claim 1, wherein the generation of the second set of thresholds comprises increasing the true positive categorization of generation of the alerts compared to the first set of thresholds.

4. A method according to claim 1, further comprising applying, by the computer, the second set of thresholds for the rule in the categorization of new datasets.

5. A method according to claim 1, further comprising adapting, by the computer, the one or more data values to the second set of thresholds.

6. A method according to claim 1, wherein the ML model generates two or more second sets of thresholds for the alert rule and determines the second set of thresholds for the alert rule by selecting the second set of thresholds which has the lowest false positive categorization of the alerts out of the two or more second sets of thresholds.

7. A method according to claim 6, wherein selecting the second set of thresholds further comprises selecting the second set of thresholds which has the highest true positive categorization of the alerts out of the two or more second sets of thresholds.

8. A method according to claim 1, further comprising selecting, by the computer, a number of threshold groups for the second set of thresholds.

9. A method according to claim 8, wherein the threshold groups for the second set of thresholds comprise an escalation alert, a standard alert and a hibernation alert.

10. A method according to claim 1, wherein the alert rule is used to block a customer account related to the dataset in case that an alert is initiated for the dataset.

11. A system for classifying datasets, the system comprising:
    a computing device;
    a memory; and
    a processor, the processor configured to:
        submit alert data items of one or more datasets to a ML model that is a decision tree, wherein the alert data items of each dataset comprise: an alert rule that initiated an alert for the dataset comprising a first set of thresholds, one or more data values assessed by the first set of thresholds in the generation of the alert, and an alert categorization of the alert selected from a group consisting of: a true positive categorization and a false positive categorization;
        assess, by the ML model, combinations of the alert categorization in relation to the one or more data values and the alert rule;
        generate, by the ML model, a second set of thresholds for the one or more data values, wherein the second set of thresholds has a reduced false positive categorization of the alerts compared to the first set of thresholds and wherein the second set of thresholds is based on reinforcement learning applied with the ML model, wherein the reinforcement learning is based on ranking the second set of thresholds based on generated threshold values; and
        update the alert rule to comprise the second set of thresholds.

12. A system according to claim 11, further comprising the assignment of scores to the generated second set of thresholds by the ML model.

13. A system according to claim 11, wherein the generation of the second set of thresholds comprises increasing the true positive categorization of generation of the alerts compared to the first set of thresholds.

14. A system according to claim 11, further comprising applying the second set of thresholds for the rule in the categorization of new datasets.

15. A system according to claim 11, further comprising adapting the one or more data values to the second set of thresholds.

16. A system according to claim 11, wherein the ML model generates two or more second sets of thresholds for the alert rule and determines the second set of thresholds for the alert rule by selecting the second set of thresholds which has the lowest false positive categorization of the alerts out of the two or more second sets of thresholds.

17. A method of dynamically categorizing customer datasets, the method comprising:
    submitting, by a computer, categorization data items of a plurality customer datasets to a ML model that is a decision tree, wherein the categorization data items of each dataset of the plurality of customer datasets comprise: a categorization rule that initiated a categorization for the customer dataset comprising a first set of ranges, wherein the categorization is selected from a group consisting of: a true positive categorization and false positive categorization, and one or more data values assessed by the first set of ranges in the generation of the categorization;
    determining, by the ML model, by the computer, combinations of the categorization in relation to the one or more data values and the categorization rule;
    generating, the ML model, by the computer, a second set of ranges for the one or more data values, wherein the second set of ranges has a reduced false positive categorization of the categorizations compared to the first set of ranges and wherein the second set of thresholds is based on reinforcement learning applied with the ML model, wherein the reinforcement learning is based on ranking the second set of thresholds based on generated threshold values; and
    replacing, by the computer, the first set of ranges with the second set of ranges.

* * * * *